US011070407B2

(12) United States Patent
Jeon et al.

(10) Patent No.: US 11,070,407 B2
(45) Date of Patent: Jul. 20, 2021

(54) PARTIAL UPLINK SUBFRAME TRANSMISSIONS ON UNLICENSED CARRIERS

(71) Applicant: APPLE INC., Cupertino, CA (US)

(72) Inventors: Jeongho Jeon, San Jose, CA (US); Huaning Niu, San Jose, CA (US); Hong He, Sunnyvale, CA (US); Hwan-Joon Kwon, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 0 days.

(21) Appl. No.: 16/465,121

(22) PCT Filed: Mar. 20, 2018

(86) PCT No.: PCT/US2018/023409
§ 371 (c)(1),
(2) Date: May 29, 2019

(87) PCT Pub. No.: WO2018/175477
PCT Pub. Date: Sep. 27, 2018

(65) Prior Publication Data
US 2019/0327117 A1    Oct. 24, 2019

Related U.S. Application Data

(60) Provisional application No. 62/502,514, filed on May 5, 2017, provisional application No. 62/476,524, filed
(Continued)

(51) Int. Cl.
| | | |
|---|---|---|
| *H04L 27/00* | (2006.01) | |
| *H04L 5/00* | (2006.01) | |
| *H04L 1/18* | (2006.01) | |
| *H04W 16/14* | (2009.01) | |

(Continued)

(52) U.S. Cl.
CPC ........ *H04L 27/0006* (2013.01); *H04L 1/1812* (2013.01); *H04L 5/0053* (2013.01);
(Continued)

(58) Field of Classification Search
CPC .............. H04W 72/0413; H04W 74/08; H04J 11/0073
See application file for complete search history.

(56) References Cited

U.S. PATENT DOCUMENTS

| | | | |
|---|---|---|---|
| 2017/0078058 A1* | 3/2017 | Marinier | H04W 72/02 |
| 2017/0265225 A1* | 9/2017 | Takeda | H04W 72/1284 |
| 2017/0325258 A1* | 11/2017 | Nogami | H04L 5/0087 |

FOREIGN PATENT DOCUMENTS

| | | |
|---|---|---|
| WO | 2016163973 A1 | 10/2016 |
| WO | 2017049560 A1 | 3/2017 |
| WO | 2017099860 A1 | 6/2017 |

OTHER PUBLICATIONS

R1-160428; 3GPP TSG RAN WG1 Meeting #84; Title: Introduction of the Non-Scheduled UL Operation for eLAA; Source: Intel Corporation; Agenda Item: 7.3.1.5; Feb. 15-19, 2016; St. Julian's, Malta.
(Continued)

*Primary Examiner* — Gregory B Sefcheck
*Assistant Examiner* — Debebe A Asefa

(57) ABSTRACT

Technology for a user equipment (UE), operable for an uplink partial subframe transmission on an unlicensed carrier is disclosed. The UE can select one or more uplink (UL) partial subframe configurations based on one or more prospective lengths of a listen before talk (LBT) period, wherein each prospective length of the LBT period provides a prospective starting time. The UE can encode data for each of the one or more UL partial subframe configurations to form one or more UL partial subframe configuration encodings. The UE can identify an actual LBT period. The UE can select one of the one or more UL partial subframe configu-
(Continued)

ration encodings for UL transmission of the data on the unlicensed carrier based on the actual LBT period and a corresponding prospective starting time.

14 Claims, 15 Drawing Sheets

Related U.S. Application Data on Mar. 24, 2017, provisional application No. 62/476,582, filed on Mar. 24, 2017.

(51) Int. Cl.
*H04W 72/04* (2009.01)
*H04W 74/08* (2009.01)

(52) U.S. Cl.
CPC ....... *H04W 16/14* (2013.01); *H04W 72/0446* (2013.01); *H04W 74/0816* (2013.01)

(56) References Cited

OTHER PUBLICATIONS

R1-152922; 3GPP TSG RAN WG1 Meeting #81; Title: Transport block preparation related to partial subframe usage; Source: Panasonic; Agenda Item: 6.2.4.3; May 25-29, 2015; Fukuoka, Japan.

R1-154512; 3GPP TSG RAN WG1 Meeting #82; Title: Data transmission in partial subframes for LAA; Source: Lenovo; Agenda Item: 7.2.4.3; Aug. 24-28, 2015; Beijing, China.

R1-157311; 3GPP TSG RAN WG1 Meeting #83; Title: On data transmission in partial subframe; Source: Nokia Networks; Agenda Item: 6.2.3.3; Nov. 15-22, 2015; Anaheim, USA.

3GPP TSG RAN WG1 #81; R1-152922: Transport block preparation related to partial subframe usage; Agenda Item: 6.2.4.3; Panasonic; Fukuoka, Japan; May 25-29, 2015.

3GPP TSG RAN WG1 #82; R1-154512: Data transmission in partial subframes for LAA; Agenda Item: 7.2.4.3; Lenovo; Beijing, China; Aug. 24-28, 2015.

3GPP TSG RAN WG1 #83; R1-157311: On data transmission in partial subgrame; Agenda Item: 6.2.3.3; Nokia Networks; Anaheim, California; Nov. 15-22, 2015.

3GPP TSG RAN WG1 #84; R1-160428: Introduction of the Non-Scheduled UL Operation for eLAA; Agenda Item: 7.3.1.5; Intel Corporaiton; St. Julian's, Malta; Feb. 15-19, 2016.

3GPP TS 36.321 , "3rd Generation Partnership Project; Technical Specification Group Radio Access Network; Evolved Universal Terrestrial Radio Access (E-UTRA); Medium Access Control (MAC) protocol specification (Release 13)", V13.0.0, Dec. 2015, 82 pages.

\* cited by examiner

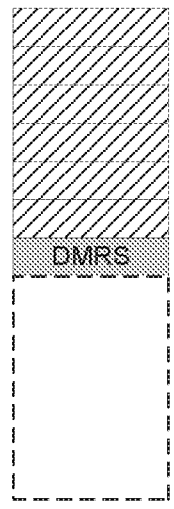
FIG. 7A
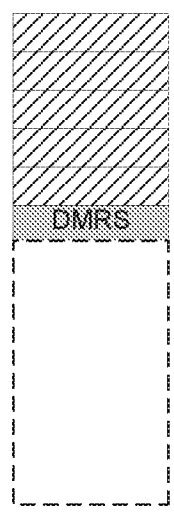
FIG. 7B
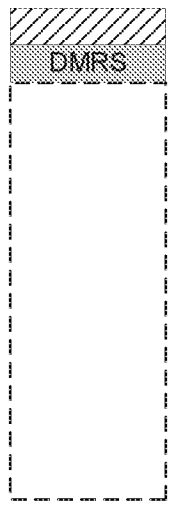
FIG. 7C
FIG. 7A – 7C

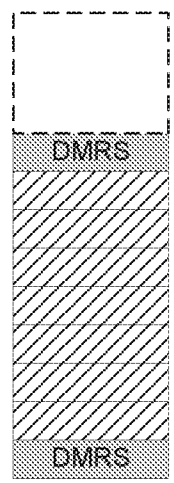
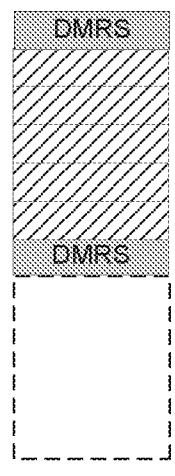
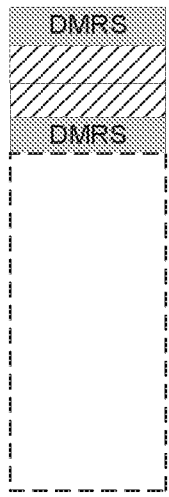
FIG. 9A
FIG. 9B
FIG. 9C
FIG. 9A – 9C

PARTIAL UPLINK SUBFRAME TRANSMISSIONS ON UNLICENSED CARRIERS

BACKGROUND

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network.

Next generation wireless communication systems are expected to be a unified network/system that is targeted to meet vastly different and sometimes conflicting performance dimensions and services. New Radio Access Technology (RAT) is expected to support a broad range of use cases including Enhanced Mobile Broadband (eMBB), Massive Machine Type Communication (mMTC), Mission Critical Machine Type Communication (uMTC), and similar service types operating in frequency ranges up to 100 GHz.

BRIEF DESCRIPTION OF THE DRAWINGS

Features and advantages of the disclosure will be apparent from the detailed description which follows, taken in conjunction with the accompanying drawings, which together illustrate, by way of example, features of the disclosure; and, wherein:

FIG. 7A illustrates a front loaded DMRS in a one slot partial UL subframe, in accordance with an example;

FIG. 7B illustrates a front loaded DMRS in a six-symbol partial UL subframe, in accordance with an example;

FIG. 7C illustrates a front loaded DMRS in a two-symbol partial UL subframe, in accordance with an example;

FIG. 9A illustrates a side loaded DMRS in a nine-symbol partial UL subframe, in accordance with an example;

FIG. 9B illustrates a side loaded DMRS in a seven-symbol partial UL subframe, in accordance with an example;

FIG. 9C illustrates a side loaded DMRS in a four-symbol partial UL subframe, in accordance with an example;

Figure 1:
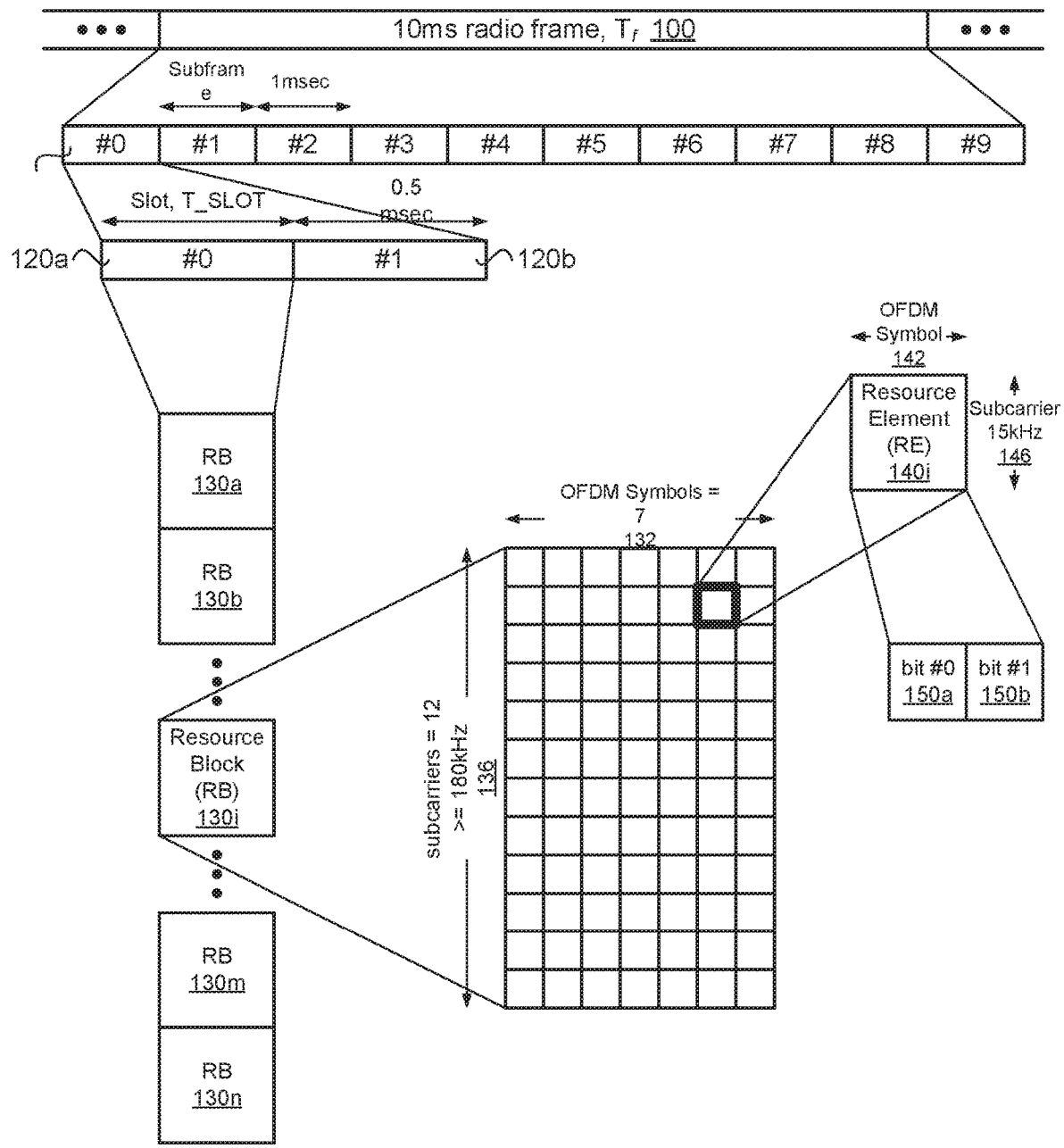
FIG. 1 illustrates a block diagram of an orthogonal frequency division multiple access (OFDMA) frame structure in accordance with an example.

Reference will now be made to the exemplary embodiments illustrated, and specific language will be used herein to describe the same. It will nevertheless be understood that no limitation of the scope of the technology is thereby intended.

DETAILED DESCRIPTION

Before the present technology is disclosed and described, it is to be understood that this technology is not limited to the particular structures, process actions, or materials disclosed herein, but is extended to equivalents thereof as would be recognized by those ordinarily skilled in the relevant arts. It should also be understood that terminology employed herein is used for the purpose of describing particular examples only and is not intended to be limiting. The same reference numerals in different drawings represent the same element. Numbers provided in flow charts and processes are provided for clarity in illustrating actions and operations and do not necessarily indicate a particular order or sequence.

Example Embodiments

An initial overview of technology embodiments is provided below and then specific technology embodiments are described in further detail later. This initial summary is intended to aid readers in understanding the technology more quickly but is not intended to identify key features or essential features of the technology nor is it intended to limit the scope of the claimed subject matter.

Wireless mobile communication technology uses various standards and protocols to transmit data between a node (e.g., a transmission station) and a wireless device (e.g., a mobile device). Some wireless devices communicate using orthogonal frequency-division multiple access (OFDMA) in a downlink (DL) transmission and single carrier frequency division multiple access (SC-FDMA) in uplink (UL). Standards and protocols that use orthogonal frequency-division multiplexing (OFDM) for signal transmission include the third generation partnership project (3GPP) long term evolution (LTE), the Institute of Electrical and Electronics Engineers (IEEE) 802.16 standard (e.g., 802.16e, 802.16m), which is commonly known to industry groups as WiMAX (Worldwide interoperability for Microwave Access), and the IEEE 802.11 standard, which is commonly known to industry groups as WiFi.

In 3GPP radio access network (RAN) LTE systems (e.g., Release 14 and earlier), the node can be a combination of Evolved Universal Terrestrial Radio Access Network (E-UTRAN) Node Bs (also commonly denoted as evolved Node Bs, enhanced Node Bs, eNodeBs, or eNBs) and Radio Network Controllers (RNCs), which communicates with the wireless device, known as a user equipment (UE). In 3GPP fifth generation (5G) LTE communication systems, the node is commonly referred to as a new radio (NR) or next generation Node B (gNodeB or gNB). The downlink (DL) transmission can be a communication from the node (e.g., eNodeB or gNodeB) to the wireless device (e.g., UE), and the uplink (UL) transmission can be a communication from the wireless device to the node.

Wireless systems typically include multiple User Equipment (UE) devices communicatively coupled to one or more Base Stations (BS). The one or more BSs may be Long Term Evolved (LTE) evolved NodeBs (eNB) or New Radio (NR) next generation NodeBs (gNB) that can be communicatively coupled to one or more UEs by a Third-Generation Partnership Project (3GPP) network. The UE can be one or more of a smart phone, a tablet computing device, a laptop computer, an internet of things (IOT) device, and/or another type of computing devices that is configured to provide digital communications. As used herein, digital communications can include data and/or voice communications, as well as control information.

As used herein, the term "Base Station (BS)" includes "Base Transceiver Stations (BTS)," "NodeBs," "evolved NodeBs (eNodeB or eNB)," and/or "next generation NodeBs (gNodeB or gNB)," and refers to a device or configured node of a mobile phone network that communicates wirelessly with UEs.

The present technology is related to uplink (UL) and downlink (DL) partial subframes on unlicensed carriers, comprising demodulation reference symbol (DMRS) transmission, and various options on the UL partial subframe transmissions. Further, the disclosed is related to Further Enhanced Licensed Assisted Access (FeLAA) work items (WI) in Release 14 (Rel-14) and Release 15 (Rel-15).

In one example, in the Rel-14 WI, uplink capacity enhancement for LTE enabled the physical uplink shared channel transmission (PUSCH) in a special subframe in addition to the sounding reference signal (SRS) transmission in special subframes, which were introduced in Release 13 (Rel-13), to better utilize the resource.

In one example, the uplink partial transmit sequence (UpPTS) symbol duration is either 1 or 2 depending on the special subframe configuration 0 through 9. The 3GPP Rel-13 full dimension multiple input and multiple output (FD-MIMO) WI introduced a new radio resource control (RRC) parameter to signal the number of additional UpPTS symbols of {2, 4}, to the existing special subframe configuration for the purpose of SRS capacity enhancement.

In one example, the Rel-14 UL capacity enhancement WI defined the special subframe configuration 10, which has 6 symbol duration downlink partial transmit sequence (DwPTS), 2 symbol duration global title (GT), and 6 symbol duration UpPTS. For network control program (NCP), the number of data symbols for PUSCH in UpPTS can be 2, 3, 4, 5, or 6 symbols.

In one example, uplink partial subframes can be supported on an unlicensed carrier. Additionally, symbol-level UL partial subframes can be supported. As such, any subset of {1, 2, 3, 4, 5, 6, 7, 8, 9, 10, 11, 12, 13} symbol durations for partial subframe PUSCH transmission can be supported.

In one example, slot level UL partial subframes are supported.

In one example the partial subframe transmission can be scheduled and indicated by UL grant. Accordingly, the partial subframe transmission duration can be indicated.

In another example, the partial subframe transmission may not be indicated. Accordingly, the UE can adapt the starting point according to the listen before talk (LBT) outcome. As such, the UE prepares multiple PUSCH encodings for the same hybrid automatic repeat request HARQ identification (ID) according to the different starting positions. The UE can also prepare on one PUSCH encoding assuming regular subframe transmission and the initial part of the subframe may be not transmitted if LBT finishes later in the middle of the subframe (i.e. punctured). Additionally, the slot level partial subframe transmission are supported, where the DMRS is used for partial subframe detection.

In one example, the UL partial subframes are used to facilitate the UL to DL switching In one example, UL partial subframes can be used to create an LBT gap for a following transmission, in the UL or DL.

In one example, UL partial subframes can be used to start a transmission immediately after a category 4 (CAT-4) LBT, instead of self-defer to the next subframe boundary, in 1-stage UL scheduling.

In one example, UL partial subframes are used to start transmission immediately after CAT-4 LBT, which can reduce the need for a reservation signal in the case of a grantless UL transmission.

In one example, a preamble signal can be appended in the beginning of a partial UL subframe to help the gNB's detection on the starting position. As such, the preamble signal can be a DMRS signal. The legacy DMRS symbol number 3 may not be transmitted. Additionally, the preamble signal can be a partial symbol, or multiple symbols, containing a repeated transmission of a 9 microsecond (us) sequence to align the slot boundary.

In one example, the UL partial subframes can be used in grantless UL transmission.

In one example, the length of the partial UL subframe can be either dynamically signaled in the UL grant or configured by higher layer signaling, such as RRC signaling, to reduce the signaling overhead.

In one example, if the UL transmission duration is adjusted by the UE itself, which is not based on the UL grant, the eNB can detect the presence of partial subframes. Additionally, the length of a partial UL subframe can be detected based on a preamble. Also, the length of a partial UL subframe can be detected based on a DMRS in each slot.

FIG. 1 provides an example of a 3GPP LTE Release 8 frame structure. In particular, FIG. 1 illustrates a downlink radio frame structure type 2. In the example, a radio frame 100 of a signal used to transmit the data can be configured to have a duration, $T_f$, of 10 milliseconds (ms). Each radio frame can be segmented or divided into ten subframes 110$i$ that are each 1 ms long. Each subframe can be further subdivided into two slots 120$a$ and 120$b$, each with a duration, $T_{slot}$, of 0.5 ms. The first slot (#0) 120$a$ can include a legacy physical downlink control channel (PDCCH) 160 and/or a physical downlink shared channel (PDSCH) 166, and the second slot (#1) 120b can include data transmitted using the PDSCH.

Each slot for a component carrier (CC) used by the node and the wireless device can include multiple resource blocks (RBs) 130a, 130b, 130i, 130m, and 130n based on the CC frequency bandwidth. The CC can have a carrier frequency having a bandwidth and center frequency. Each subframe of the CC can include downlink control information (DCI) found in the legacy PDCCH. The legacy PDCCH in the control region can include one to three columns of the first Orthogonal Frequency Division Multiplexing (OFDM) symbols in each subframe or RB, when a legacy PDCCH is used. The remaining 11 to 13 OFDM symbols (or 14 OFDM symbols, when legacy PDCCH is not used) in the subframe may be allocated to the PDSCH for data (for short or normal cyclic prefix).

The control region can include physical control format indicator channel (PCFICH), physical hybrid automatic repeat request (hybrid-ARQ) indicator channel (PHICH), and the PDCCH. The control region has a flexible control design to avoid unnecessary overhead. The number of OFDM symbols in the control region used for the PDCCH can be determined by the control channel format indicator (CFI) transmitted in the physical control format indicator channel (PCFICH). The PCFICH can be located in the first OFDM symbol of each subframe. The PCFICH and PHICH can have priority over the PDCCH, so the PCFICH and PHICH are scheduled prior to the PDCCH.

Each RB (physical RB or PRB) 130i can include 12-15 kilohertz (kHz) subcarriers 136 (on the frequency axis) and 6 or 7 orthogonal frequency-division multiplexing (OFDM) symbols 132 (on the time axis) per slot. The RB can use seven OFDM symbols if a short or normal cyclic prefix is employed. The RB can use six OFDM symbols if an extended cyclic prefix is used. The resource block can be mapped to 84 resource elements (REs) 140i using short or normal cyclic prefixing, or the resource block can be mapped to 72 REs (not shown) using extended cyclic prefixing. The RE can be a unit of one OFDM symbol 142 by one subcarrier (i.e., 15 kHz) 146.

Each RE can transmit two bits 150a and 150b of information in the case of quadrature phase-shift keying (QPSK) modulation. Other types of modulation may be used, such as 16 quadrature amplitude modulation (QAM) or 64 QAM to transmit a greater number of bits in each RE, or bi-phase shift keying (BPSK) modulation to transmit a lesser number of bits (a single bit) in each RE. The RB can be configured for a downlink transmission from the eNodeB to the UE, or the RB can be configured for an uplink transmission from the UE to the eNodeB.

This example of the 3GPP LTE Release 8 frame structure provides examples of the way in which data is transmitted, or the transmission mode. The example is not intended to be limiting. Many of the Release 8 features will evolve and change in 5G frame structures included in 3GPP LTE Release 15 and beyond. In such a system, the design constraint is on co-existence with multiple 5G numerologies in the same carrier due to the coexistence of different network services, such as eMBB (enhanced Mobile Broadband) 204, mMTC (massive Machine Type Communications or massive IoT) 202 and URLLC (Ultra Reliable Low Latency Communications or Critical Communications) 206. The carrier in a 5G system can be above or below 6 GHz. In one embodiment, each network service can have a different numerology.

FIGS. 2 through 9C are illustrations of various frame structures. Each illustrated structure in FIGS. 2-9C represent an example numerology shown in the time domain. The examples illustrated herein are not intended to be limiting.

Figure 2:
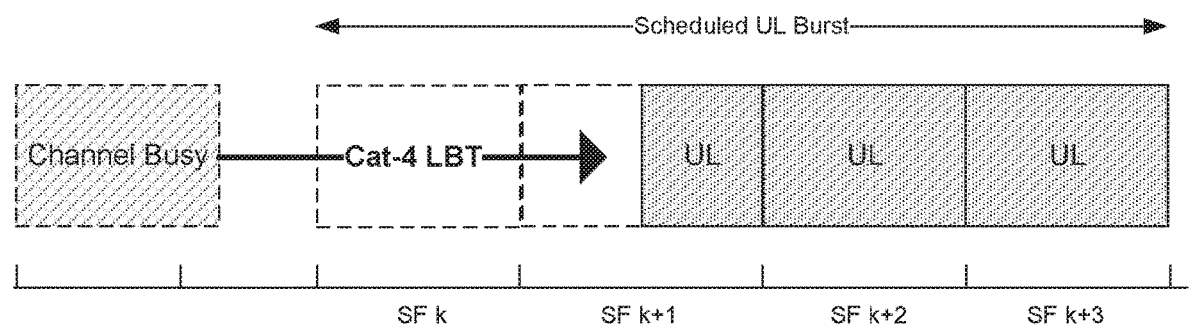
FIG. 2 illustrates a user equipment (UE) performed category 4 listen before talk (LBT), in accordance with an example.

FIG. 2 illustrates a frame structure for a user equipment (UE) configured to perform a category 4 listen before talk (LBT) operation. In FIG. 2, a scenario is considered where a UE is scheduled to perform Category 4 LBT before the UE sends an UL transmission. As illustrated in FIG. 2, the instance at which the LBT is complete can be anytime in between the subframe boundaries due to the randomly drawn backoff counter and the unpredictable unlicensed carrier medium occupancy. Therefore, in principle, the introduction of partial UL subframes can be beneficial to both a 3GPP LTE system and other neighboring radio access network (RAN) systems, such as Wi-Fi, due to the improved medium utilization efficiency and, as a result, a shortened activity duration. Thus, symbol-level UL partial subframes can be considered.

In one embodiment, adapting the UL subframe starting position in accordance to the LBT outcome will significantly increase a UE's overhead from an operational perspective. The overhead can increase because the UE has to prepare multiple starting positions, i.e., prepare multiple PUSCH encoding versions, as the UE cannot precisely estimate the instance of at which the LBT is complete, referred to herein as LBT finish.

In one embodiment, a UE can be scheduled for multiple consecutive subframes. It can be assumed that slot-level UL partial subframes are supported as in 3GPP Rel-13 Licensed Assisted Access (LAA) for simplicity. The UE then has to prepare the PUSCH transmission for a full subframe and the slot-level half subframe separately. The preparation of the different PUSCH encodings for the same subframe would not only necessitate higher processing capability by the UE, but also need a larger on chip memory size for the transmission pipeline. In turn, allowing multiple starting positions for the UL subframe also necessitates the eNB's detection of the starting position as well. Therefore, there is a motivation to limit the possible starting positions. Thus, a slot-level partial UL subframe can be considered.

In one embodiment, where there is a UE implementation issue, where the drawn random counter is too big to finish before the subframe boundary, the drawn random counter can finish before some other staring position within a subframe at the earliest. Accordingly, the UE can skip the preparation of those PUSCH encodings that apparently cannot be transmitted.

In another embodiment, for simplicity of UE operation, it is also possible that the UE can be configured to not do special handling according to the instance of LBT finish. That is, the UE can simply transmit from the instance when the LBT finishes with the PUSCH encoding assuming a regular UL subframe. Therefore, the initial part of the PUSCH before the LBT success is simply not transmitted.

In one embodiment, if it is the case that the UE adapts to the starting position according to the LBT outcome, the partial subframe transmission should be detectable by the eNB. As the DL partial subframe detection by a UE is an implementation issue, the exact method of detecting the partial UL subframe can be up to eNB implementation. However, it can be practically assumed that the eNB's detection will rely on the detection of the DMRS. Therefore, the granularity of the partial subframe transmission can only be slot-level such that the DMRS in each slot can be used as a distinguisher for eNB between full subframe versus one slot partial subframe transmission. In this case, as the DMRS can be used for the partial subframe detection, the DMRS in the partial subframe can be transmitted in the legacy position.

In one embodiment, to help the eNB's detection on the starting position, a preamble signal can be appended in the beginning of a partial UL subframe. For instance, the preamble signal can be a DMRS. Other options are not precluded. The legacy DMRS in symbol #3 may not be transmitted.

Another motivating scenario is the case when the maximum channel occupancy time (MCOT) obtained by the eNB is shared with the associated UEs. With the introduction of UL partial subframes, the switching from DL to UL can be performed more flexibly and in a finer granularity.

In one embodiment the ending UL subframes can be partial, for instance, if the MCOT is obtained in the middle of a subframe and, thus, ends in the middle of a subframe. To maximally utilize the obtained MCOT, the eNB can schedule a partial UL subframe transmission. On the other hand, it is also possible that the ending partial UL subframe is used to generate an LBT gap for a following transmission.

Figure 3:
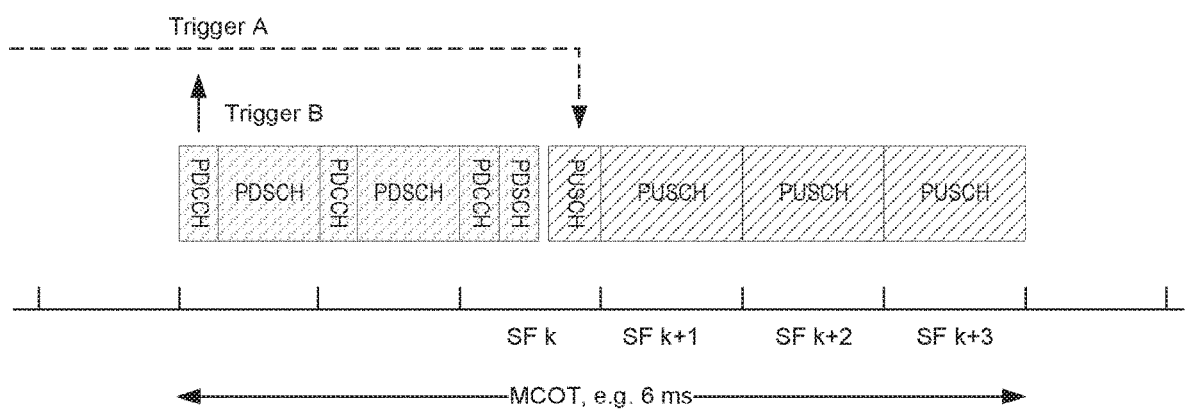
FIG. 3 illustrates a use case of a partial subframe for downlink (DL) and uplink (UL) switching, in accordance with an example.

FIG. 3 illustrates a use case of a partial subframe for downlink (DL) and uplink (UL) switching. The introduction of a partial UL subframe is also useful when the MCOT obtained by the eNB is shared with the associated UEs, as illustrated in FIG. 3. FIG. 3 illustrates switching between DL and UL part of the way through a subframe k (SF k). With the introduction of UL partial subframes, the switching from DL to UL can be performed more flexibly and in a finer granularity.

Figure 4:
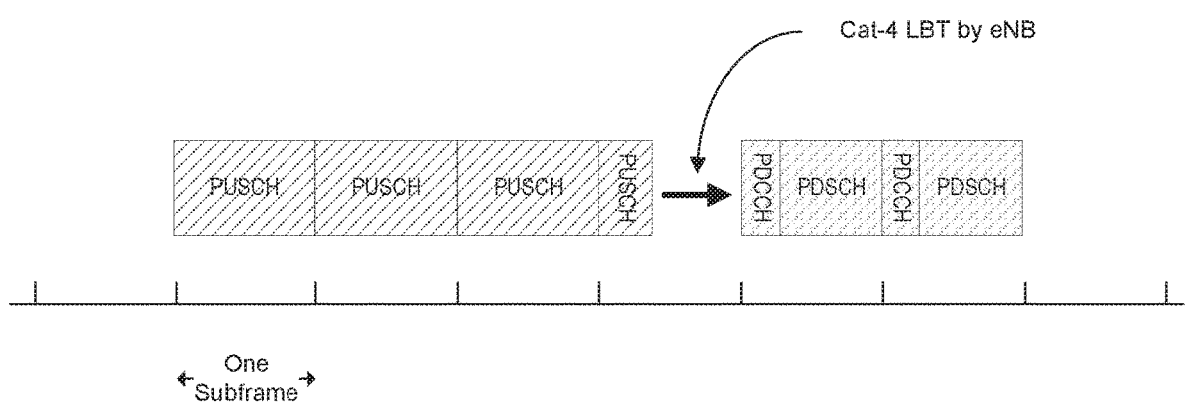
FIG. 4 illustrates a use case of a partial UL subframe to create a gap for LBT, in accordance with an example.

FIG. 4 illustrates a use case of a partial UL subframe to create a gap for LBT. Additionally, FIG. 4 illustrates another motivation scenario, where the ending partial UL subframe is used to generate an LBT gap for following transmission. The following transmission can be either DL or UL.

In these scenarios, in FIG. 3 or FIG. 4, the UE's preparation for multiple hypothesis, or the eNB's detection of the starting position, can be avoided if the presence of the upcoming UL partial subframe is signaled to the UE. Both a normal grant and a two-stage grant can be extended to signal the presence of an upcoming partial UL subframe. The length of the partial UL subframe can be either dynamically signaled in the UL grant or RRC configured to reduce the signaling overhead.

In one example, Symbol-level UL partial subframes are supported. In other words, any subset of {1, 2, 3, 4, 5, 6, 7, 8, 9, 10, 11, 12, 13} symbol durations for partial subframe PUSCH transmissions are supported.

In one example, the partial UL transmission on a Licensed-Assisted Access (LAA) secondary cell (SCell) can be based on the existing mechanism for PUSCH transmission in uplink pilot time slot (UpPTS) developed during a 3GPP Rel-14 UL coverage enhancement WI to minimize the specification effort. From 3GPP Rel-14, the PUSCH in UpPTS can have a length of {2, 3, 4, 5, 6} symbol durations.

Figure 5:
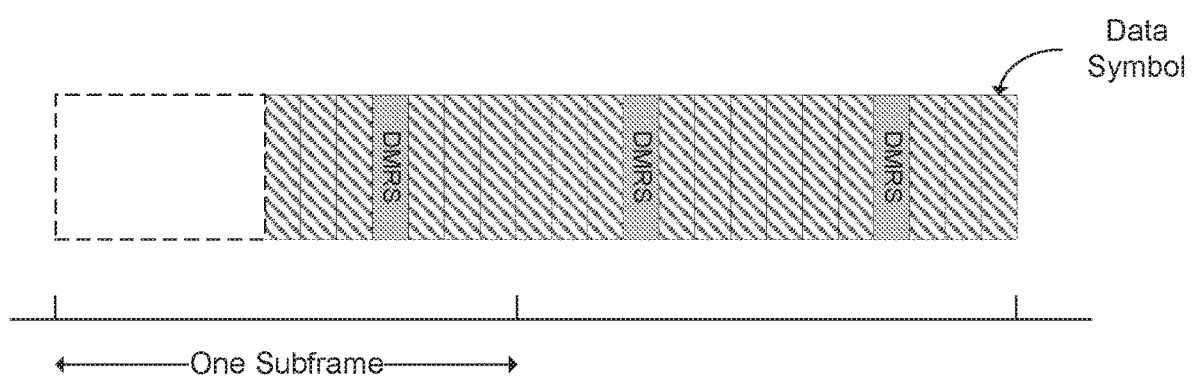
FIG. 5 illustrates a demodulation reference symbol (DMRS) transmission in a partial uplink (UL) subframe, in accordance with an example.

FIG. 5 illustrates a demodulation reference symbol (DMRS) transmission in a partial uplink (UL) subframe. If the partial UL subframe is standalone from a UE perspective, i.e., not followed by another UL subframe scheduled for the same UE, the DMRS can be transmitted in the partial UL subframe. In the case of a standalone partial UL subframe, the duration of a partial UL subframe that can be scheduled, including possible SRS symbols, should at least 4 symbols such that at least the DMRS in the second slot can be transmitted.

In one example, if a partial UL subframe is non-standalone from a UE perspective, i.e., not followed by another UL subframe scheduled for the same UE, the DMRS may not be transmitted in the partial UL subframe. In the case of non-standalone partial UL subframes, the duration of a partial UL subframe that can be scheduled, including possible SRS symbols, can be less than 4 symbols, in which case the DMRS in the partial UL subframe is omitted.

In one example, shifting the DMRS position is considered. Locating the DMRS at the unbiased middle position within the transmitted partial subframe is advantageous for coherent demodulation. The shifted location of the DMRS can also be used to detect the duration of partial UL subframes if the UE autonomously adjusts the transmission starting position within a subframe and eNB has to detect it.

Figure 6A:
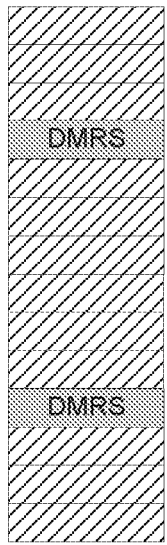
FIG. 6A illustrates a DMRS symbol position in a regular UL subframe, in accordance with an example.
Figure 6B:
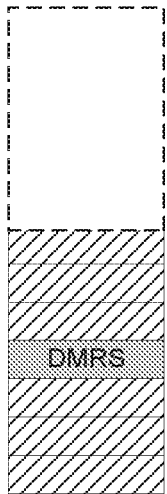
FIG. 6B illustrates a shifted DMRS symbol position in a one slot partial UL subframe of a first slot in a subframe, in accordance with an example.
Figure 6C:
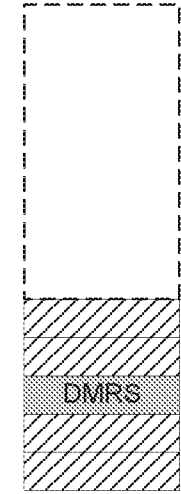
FIG. 6C illustrates a shifted DMRS symbol position in a one slot partial UL subframe of a second slot in a subframe, in accordance with an example.

Several possible example embodiments of partial subframes are illustrated in FIG. 6, and the corresponding FIG. 6A-6G Each partial subframe can include a plurality of symbols, as illustrated in the FIGS. 6A-6G. FIG. 6A illustrates a DMRS symbol position in a regular UL subframe. FIG. 6B illustrates a shifted DMRS symbol position in a one slot partial UL subframe of a first slot in a subframe. FIG. 6C illustrates a shifted DMRS symbol position in a one slot partial UL subframe of a second slot in a subframe. For slot based partial UL subframes, the DMRS can be located in the legacy position, i.e., symbol 3.

Figure 6D:
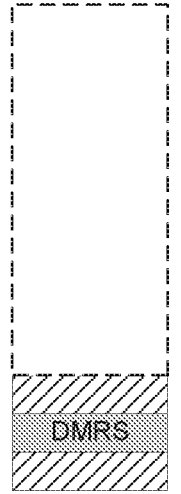
FIG. 6D illustrates a shifted DMRS symbol position in a five-symbol partial UL subframe, in accordance with an example.
Figure 6E:
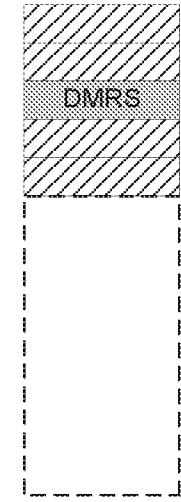
FIG. 6E illustrates a shifted DMRS symbol position in a five-symbol partial UL subframe.

FIG. 6D illustrates a shifted DMRS symbol position in a five-symbol partial UL subframe comprising a first five slots in a symbol. FIG. 6E illustrates a shifted DMRS symbol position in a five-symbol partial UL subframe comprising a last five slots in a symbol. For 5 symbol duration UL partial subframes, the DMRS can be located in the symbol 2 and symbol 4 for the case of starting and ending UL partial subframes, respectively.

Figure 6F:
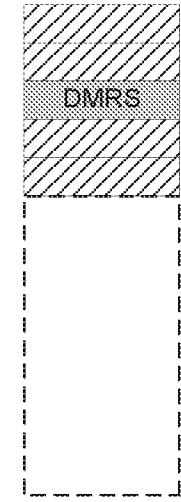
FIG. 6F illustrates a shifted DMRS symbol position in a three-symbol partial UL subframe.
Figure 6G:
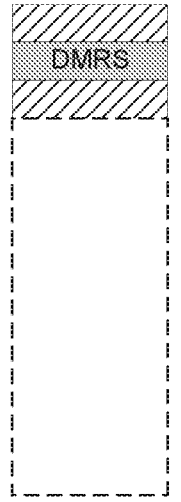
FIG. 6G illustrates a shifted DMRS symbol position in a three-symbol partial UL subframe, in accordance with an example.

FIG. 6F illustrates a shifted DMRS symbol position in a three-symbol partial UL subframe. FIG. 6G illustrates a shifted DMRS symbol position in a three-symbol partial UL subframe. For 3 symbol duration UL partial subframes, the DMRS is located in the symbol 1 and symbol 5 for the case of starting and ending UL partial subframes, respectively.

In one embodiment, in the case of even numbered PUSCH durations, the DMRS cannot be precisely located in the center position. For 6 symbol duration UL partial subframes, the DMRS can be located in either symbol 2 or 3 for the ending partial subframe and in either symbol 3 or 4 for the starting partial subframe. For 4 symbol duration UL partial subframes, the DMRS can be located in either symbol 1 or 2 for the ending partial subframe and in either symbol 4 or 5 for the starting partial subframe. For 2 symbol duration UL partial subframes, the DMRS can be located in either symbol 0 or 1 for the ending partial subframe and in either symbol 5 or 6 for the starting partial subframe.

In one embodiment, in the case of even numbered PUSCH durations, the DMRS can have a different sequence to be distinguished from the odd numbered PUSCH durations which has the DMRS in the identical position. Alternatively, the sequence can be differentiated from the different sequence itself. Different types of sequences may be used, such as a Zadoff-Chu (ZC) sequence, a sequence with a different cyclic shift, a different base sequence, or a different hopping and sequence shift pattern.

FIGS. 7A-7C illustrate front loaded DMRS in partial UL subframes. FIG. 7A illustrates a front loaded DMRS in a one slot partial UL subframe. FIG. 7B illustrates a front loaded DMRS in a six-symbol partial UL subframe. FIG. 7C illustrates a front loaded DMRS in a two-symbol partial UL subframe. The front loaded DMRS is useful especially for a starting partial subframe. The front loaded DMRS can be helpful to detect the partial UL subframe duration as well.

Figures 8A, 8B, 8C:
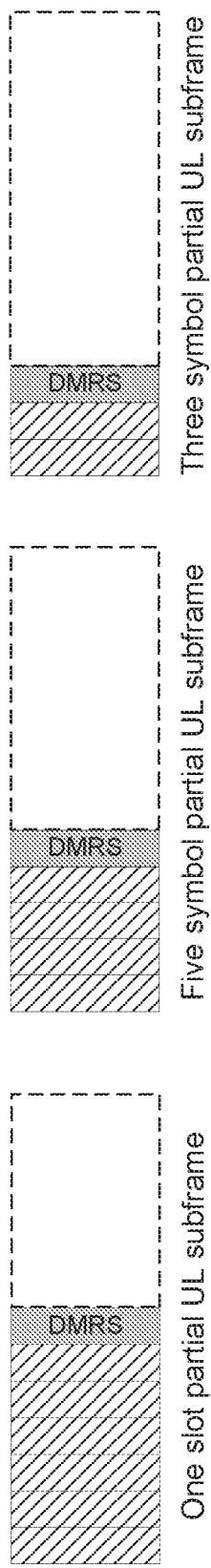
FIG. 8A illustrates a rear loaded DMRS in a one slot partial UL subframe, in accordance with an example.
FIG. 8B illustrates a rear loaded DMRS in a five-symbol partial UL subframe, in accordance with an example.
FIG. 8C illustrates a rear loaded DMRS in a three-symbol partial UL subframe, in accordance with an example.

FIGS. 8A-8C illustrate a rear loaded DMRS in partial UL subframes. FIG. 8A illustrates a rear loaded DMRS in a one slot partial UL subframe. FIG. 8B illustrates a rear loaded DMRS in a five-symbol partial UL subframe. FIG. 8C illustrates a rear loaded DMRS in a three-symbol partial UL subframe. The rear loaded DMRS can be useful especially for ending a partial subframe. The rear loaded DMRS can be helpful to detect the partial UL subframe duration as well.

FIGS. 9A-9C illustrates a side loaded DMRS in partial UL subframes with a DMRS symbol located in the first and last symbol location of a partial UL subframe. FIG. 9A illustrates a side loaded DMRS in a nine-symbol partial UL subframe. FIG. 9B illustrates a side loaded DMRS in a seven-symbol partial UL subframe. FIG. 9C illustrates a side loaded DMRS in a four-symbol partial UL subframe. The side loaded DMRS can be useful especially for both a starting and an ending partial subframe. The side loaded DMRS can be helpful to detect the partial UL subframe duration as well.

Figure 10:
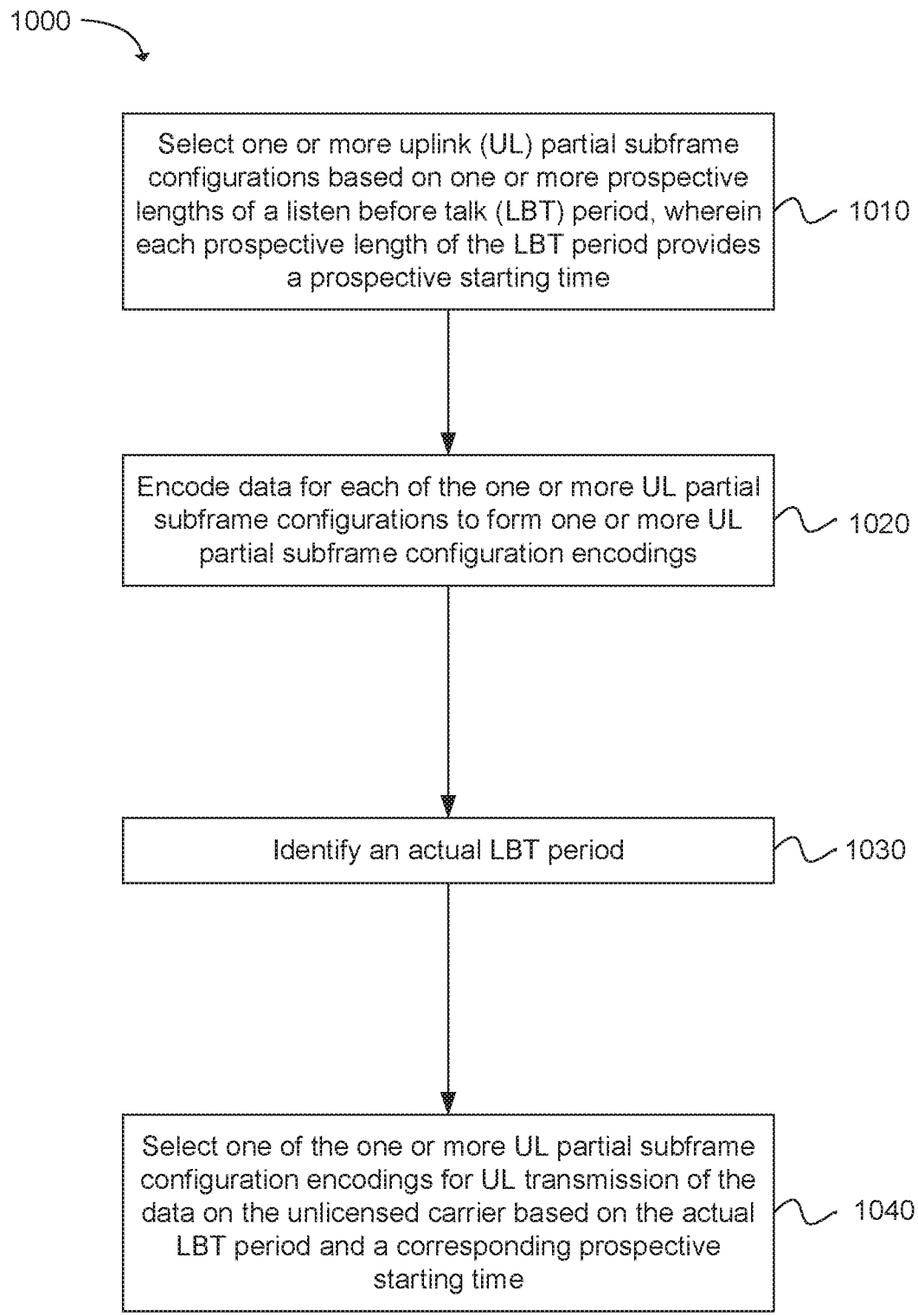
FIG. 10 depicts functionality of a user equipment (UE) operable for an uplink partial subframe transmission on an unlicensed carrier in accordance with an example.

FIG. 10 depicts functionality 1000 of a user equipment (UE) operable for an uplink partial subframe transmission on an unlicensed carrier. The UE can comprise one or more processors configured to select one or more uplink (UL) partial subframe configurations based on one or more prospective lengths of a listen before talk (LBT) period, wherein each prospective length of the LBT period provides a prospective starting time 1010. The UE can comprise one or more processors configured to encode data for each of the one or more UL partial subframe configurations to form one or more UL partial subframe configuration encodings 1020. The UE can comprise one or more processors configured to identify an actual LBT period 1030. The UE can comprise one or more processors configured to select one of the one or more UL partial subframe configuration encodings for UL transmission of the data on the unlicensed carrier based on the actual LBT period and a corresponding prospective starting time 1040.

In one embodiment, the one or more processors are further configured to encode the data for each of the one or more UL partial subframe configurations for transmission in a physical uplink shared channel (PUSCH).

In one embodiment, the one or more processors are further configured to encode the data in the PUSCH with a symbol duration of 2, 3, 4, 5, or 6 symbols in a UL partial subframe.

In one embodiment, the one or more processors are further configured to link each of the one or more UL partial subframe configuration encodings with a selected start time, wherein each selected start time is associated with a different encoding; and link each of the one or more UL partial subframe configuration encodings with a same hybrid automatic repeat request (HARQ) identification (ID).

In one embodiment, the one or more processors are further configured to encode the data for each of the one or more UL partial subframe configurations, wherein each UL partial subframe configuration is based on a symbol level UL partial subframe or a slot level UL partial subframe.

In one embodiment, the one or more UL partial subframe configuration encodings enables a use of UL partial subframes to provide UL to downlink (DL) switching between subframes.

In one embodiment, the one or more UL partial subframe configuration encodings enables a use of UL partial subframes to create a variable length LBT period prior to a transmission of data.

In one embodiment, the one or more processors are further configured to encode the data for each of the one or more UL partial subframe configurations for transmission immediately following a variable length LBT period.

In one embodiment, the variable length LBT period is a category 4 (CAT-4) LBT.

In one embodiment, the one or more processors are further configured to decode an UL grant, wherein the UL grant is used to schedule and indicate UL partial subframes.

In one embodiment, the one or more processors are further configured to encode the data for each of the one or more UL partial subframe configurations for a grantless UL transmission.

In one embodiment, the one or more processors are further configured to decode an UL grant, wherein the UL grant includes one or more lengths for a partial subframe in the one or more UL partial subframe configuration encodings.

In one embodiment, the one or more processors are further configured to decode a radio resource control (RRC) message, wherein the RRC message includes one or more lengths for a partial subframe in the one or more UL partial subframe configuration encodings.

Figure 11:
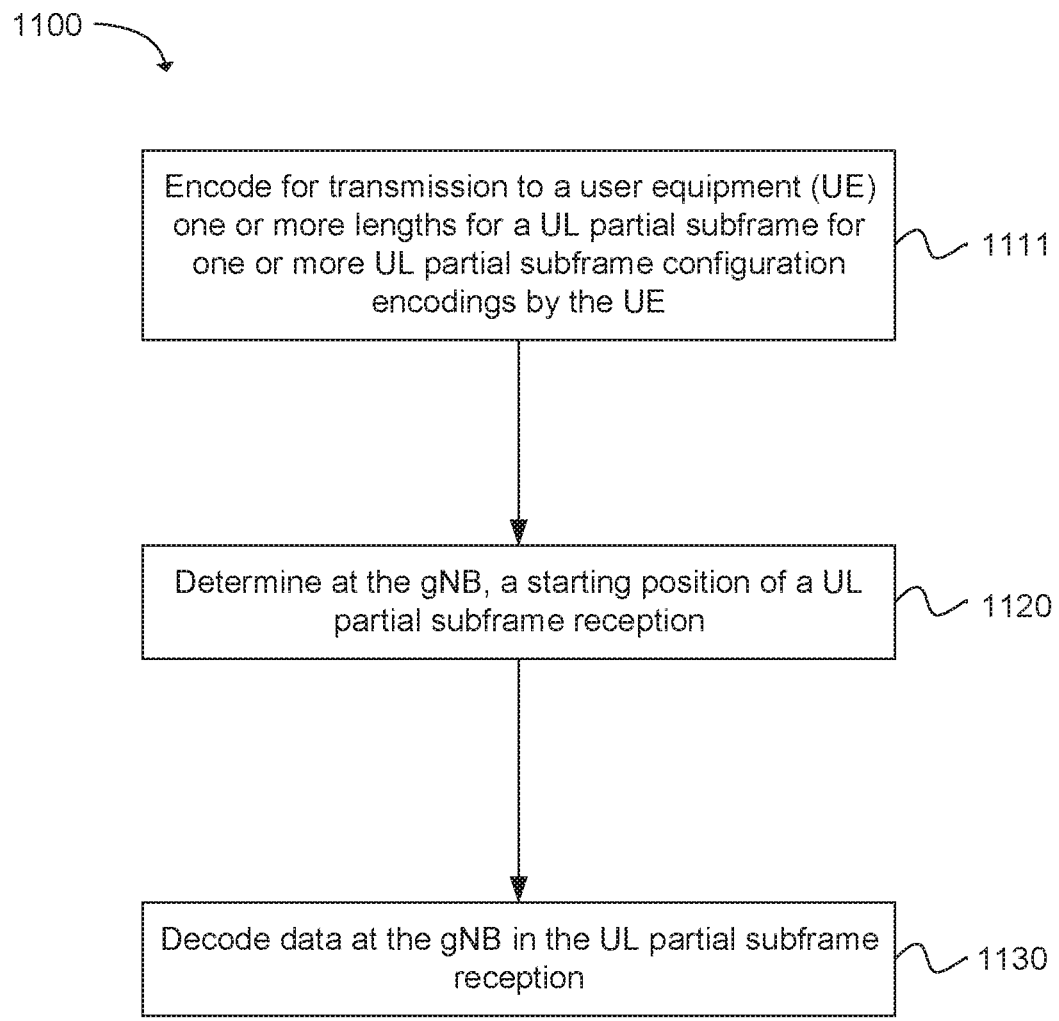
FIG. 11 depicts functionality of a base station (BS) for an uplink (UL) partial subframe reception on an unlicensed carrier in accordance with an example.

FIG. 11 depicts functionality 1100 of a base station (BS) for an uplink (UL) partial subframe reception on an unlicensed carrier. The BS can comprise one or more processors configured to encode for transmission to a user equipment (UE) one or more lengths for a UL partial subframe for one or more UL partial subframe configuration encodings by the UE 1111. The BS can comprise one or more processors configured to determine at the BS, a starting position of a UL partial subframe reception 1120. The BS can comprise one or more processors configured to decode data at the BS in the UL partial subframe reception 1130.

In one embodiment, the one or more processors are further configured to decode the data at the BS in a physical uplink shared channel (PUSCH) partial subframe reception.

In one embodiment, the one or more processors are further configured to determine the starting position based on a demodulation reference signal (DMRS) in a preamble of the UL partial subframe reception.

In one embodiment, the one or more processors are further configured to decode the DMRS in a UL partial subframe.

In one embodiment, the one or more processors are further configured to decode the DMRS in a partial symbol, or multiple symbols.

In one embodiment, the one or more processors are further configured to decode the DMRS in multiple symbols containing a repeated reception of a 9-microsecond sequence to align a slot boundary of an UL partial subframe.

In one embodiment, the one or more processors are further configured to blindly detect a length of the one or more lengths for the UL partial subframe based on the preamble.

Figure 12:
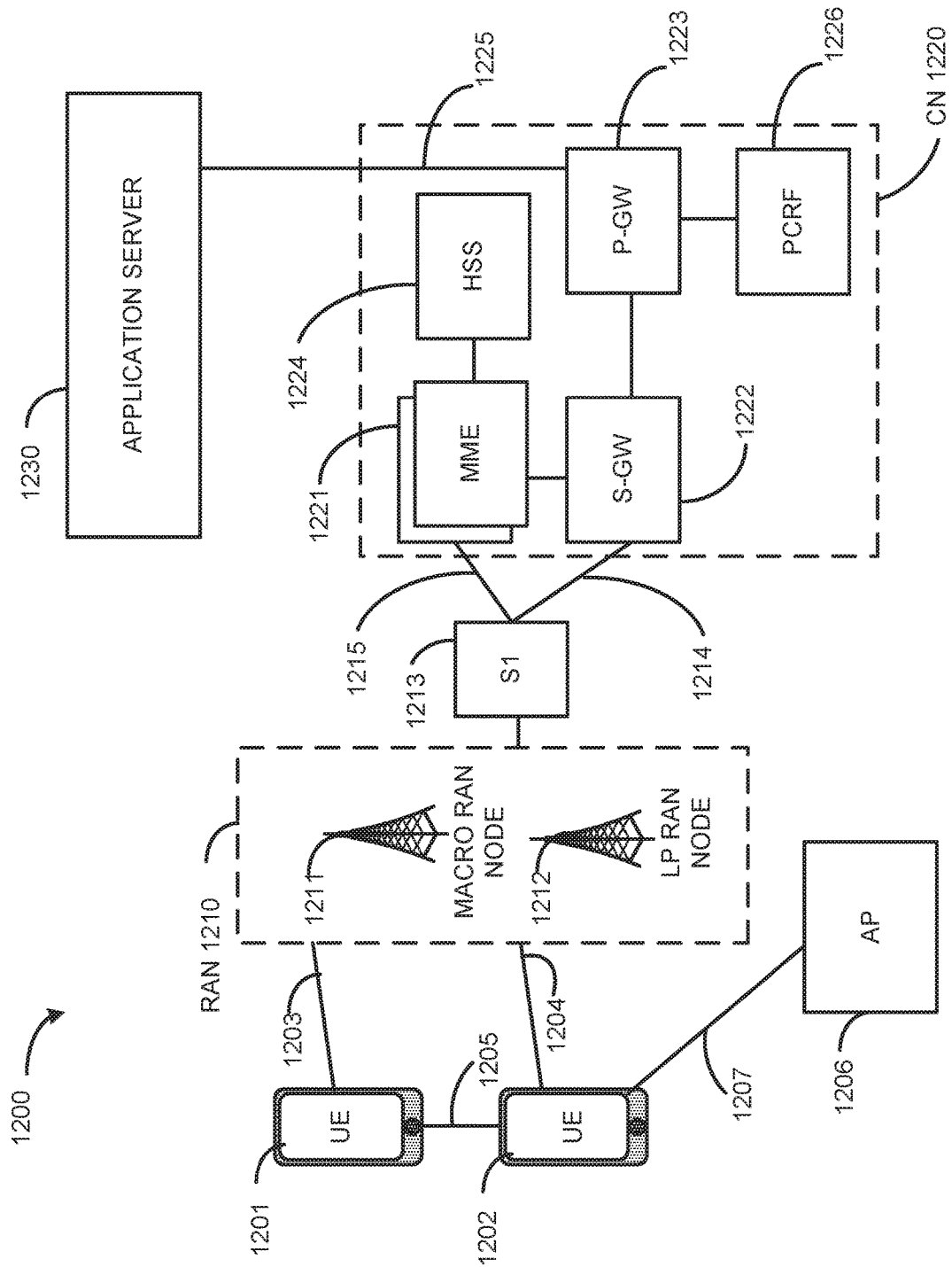
FIG. 12 illustrates an architecture of a network in accordance with an example.

FIG. 12 illustrates architecture of a system 1200 of a network in accordance with some embodiments. The system 1200 is shown to include a user equipment (UE) 1201 and a UE 1202. The UEs 1201 and 1202 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UEs 1201 and 1202 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UEs 1201 and 1202 may be configured to connect, e.g., communicatively couple, with a radio access network (RAN) 1210—the RAN 1210 may be, for example, an Evolved Universal Mobile Telecommunications System (UMTS) Terrestrial Radio Access Network (E-UTRAN), a Ne8Gen RAN (NG RAN), or some other type of RAN. The UEs 1201 and 1202 utilize connections 1203 and 1204, respectively, each of which comprises a physical communications interface or layer (discussed in further detail below); in this example, the connections 1203 and 1204 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UEs 1201 and 1202 may further directly exchange communication data via a ProSe interface 1205. The ProSe interface 1205 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1202 is shown to be configured to access an access point (AP) 1206 via connection 1207. The connection 1207 can comprise a local wireless connection, such as a connection consistent with any IEEE 802.11 protocol, wherein the AP 1206 would comprise a wireless fidelity (WiFi®) router. In this example, the AP 1206 is shown to be connected to the Internet without connecting to the core network of the wireless system (described in further detail below).

The RAN 1210 can include one or more access nodes that enable the connections 1203 and 1204. These access nodes (ANs) can be referred to as base stations (BSs), NodeBs, evolved NodeBs (eNBs), ne8 Generation NodeBs (gNB), RAN nodes, and so forth, and can comprise ground stations (e.g., terrestrial access points) or satellite stations providing coverage within a geographic area (e.g., a cell). The RAN 1210 may include one or more RAN nodes for providing macrocells, e.g., macro RAN node 1211, and one or more RAN nodes for providing femtocells or picocells (e.g., cells having smaller coverage areas, smaller user capacity, or higher bandwidth compared to macrocells), e.g., low power (LP) RAN node 1212.

Any of the RAN nodes 1211 and 1212 can terminate the air interface protocol and can be the first point of contact for the UEs 1201 and 1202. In some embodiments, any of the RAN nodes 1211 and 1212 can fulfill various logical functions for the RAN 1210 including, but not limited to, radio network controller (RNC) functions such as radio bearer management, uplink and downlink dynamic radio resource management and data packet scheduling, and mobility management.

In accordance with some embodiments, the UEs 1201 and 1202 can be configured to communicate using Orthogonal Frequency-Division Multiplexing (OFDM) communication signals with each other or with any of the RAN nodes 1211 and 1212 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the RAN nodes 1211 and 1212 to the UEs 1201 and 1202, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UEs 1201 and 1202. The physical downlink control channel (PDCCH) may carry information about the transport format and resource allocations related to the PDSCH channel, among other things. It may also inform the UEs 1201 and 1202 about the transport format, resource allocation, and H-ARQ (Hybrid Automatic Repeat Request) information related to the uplink shared channel. Typically, downlink scheduling (assigning control and shared channel resource blocks to the UE 102 within a cell) may be performed at any of the RAN nodes 1211 and 1212 based on channel quality information fed back from any of the UEs 1201 and 1202. The downlink resource assignment information may be sent on the PDCCH used for (e.g., assigned to) each of the UEs 1201 and 1202.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an e8ension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as an enhanced resource element groups (EREGs). An ECCE may have other numbers of EREGs in some situations.

The RAN 1210 is shown to be communicatively coupled to a core network (CN) 1220—via an S1 interface 1213. In embodiments, the CN 1220 may be an evolved packet core (EPC) network, a Ne8Gen Packet Core (NPC) network, or some other type of CN. In this embodiment the S1 interface 1213 is split into two parts: the S1-U interface 1214, which carries traffic data between the RAN nodes 1211 and 1212 and the serving gateway (S-GW) 1222, and the S1-mobility management entity (MME) interface 1215, which is a signaling interface between the RAN nodes 1211 and 1212 and MMEs 1221.

In this embodiment, the CN 1220 comprises the MMEs 1221, the S-GW 1222, the Packet Data Network (PDN) Gateway (P-GW) 1223, and a home subscriber server (HSS) 1224. The MMEs 1221 may be similar in function to the control plane of legacy Serving General Packet Radio Service (GPRS) Support Nodes (SGSN). The MMEs 1221 may manage mobility aspects in access such as gateway selection and tracking area list management. The HSS 1224 may comprise a database for network users, including subscription-related information to support the network entities' handling of communication sessions. The CN 1220 may comprise one or several HSSs 1224, depending on the number of mobile subscribers, on the capacity of the equipment, on the organization of the network, etc. For example, the HSS 1224 can provide support for routing/roaming, authentication, authorization, naming/addressing resolution, location dependencies, etc.

The S-GW 1222 may terminate the S1 interface 1213 towards the RAN 1210, and routes data packets between the RAN 1210 and the CN 1220. In addition, the S-GW 1222 may be a local mobility anchor point for inter-RAN node handovers and also may provide an anchor for inter-3GPP mobility. Other responsibilities may include lawful intercept, charging, and some policy enforcement.

The P-GW 1223 may terminate an SGi interface toward a PDN. The P-GW 1223 may route data packets between the EPC network 1223 and e8ernal networks such as a network including the application server 1230 (alternatively referred to as application function (AF)) via an Internet Protocol (IP) interface 1225. Generally, the application server 1230 may be an element offering applications that use IP bearer resources with the core network (e.g., UMTS Packet Services (PS) domain, LTE PS data services, etc.). In this embodiment, the P-GW 1223 is shown to be communicatively coupled to an application server 1230 via an IP communications interface 1225. The application server 1230 can also be configured to support one or more communication services (e.g., Voice-over-Internet Protocol (VoIP) sessions, PTT sessions, group communication sessions, social networking services, etc.) for the UEs 1201 and 1202 via the CN 1220.

The P-GW 1223 may further be a node for policy enforcement and charging data collection. Policy and Charging Enforcement Function (PCRF) 1226 is the policy and charging control element of the CN 1220. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1226 may be communicatively coupled to the application server 1230 via the P-GW 1223. The application server 1230 may signal the PCRF 1226 to indicate a new service flow and select the appropriate Quality of Service (QoS) and charging parameters. The PCRF 1226 may provision this rule into a Policy and Charging Enforcement Function (PCEF) (not shown) with the appropriate traffic flow template (TFT) and QoS class of identifier (QCI), which commences the QoS and charging as specified by the application server 1230.

Figure 13:
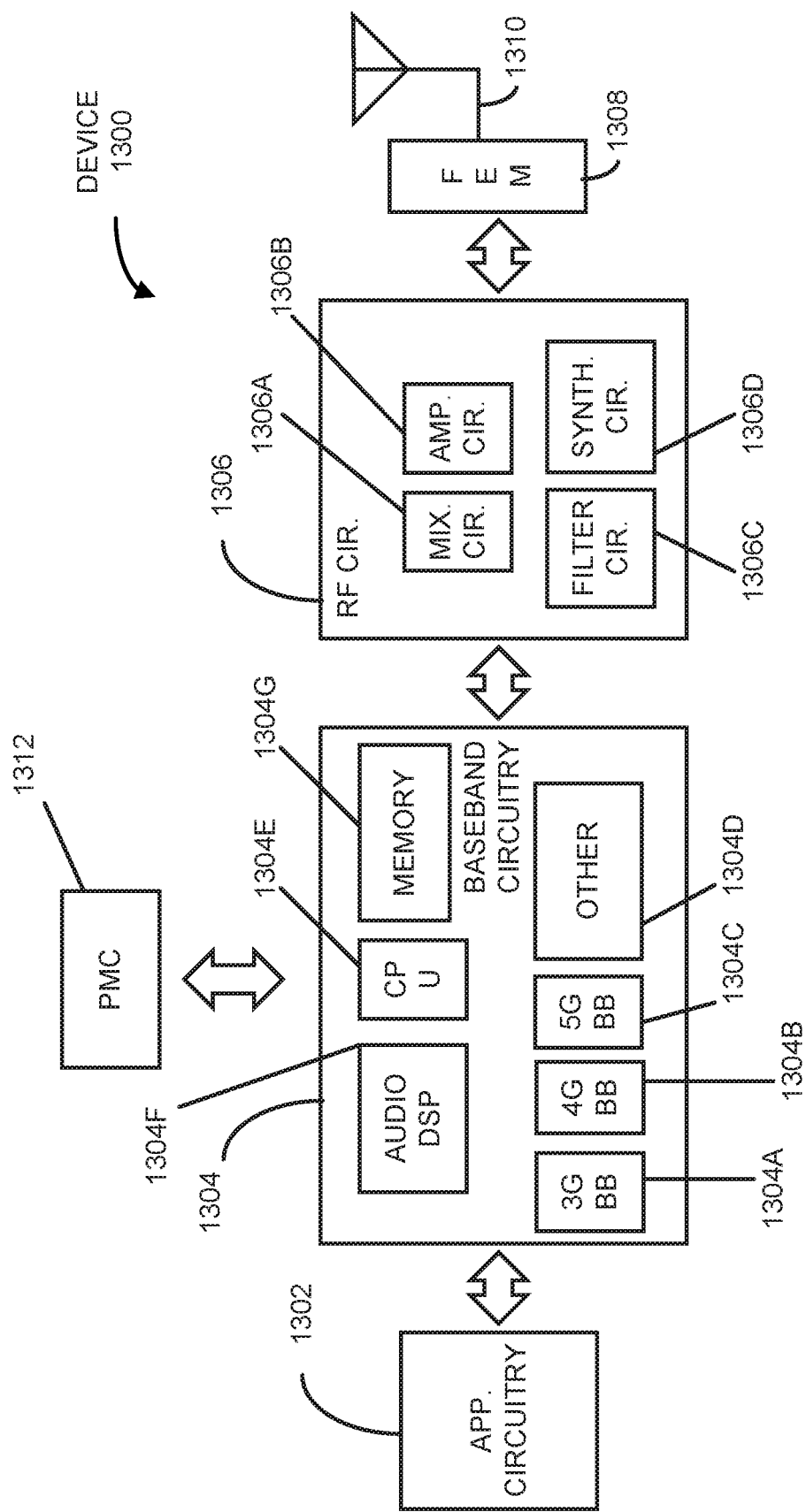
FIG. 13 illustrates a diagram of a wireless device (e.g., UE) and a base station (e.g., eNodeB) in accordance with an example.

FIG. 13 illustrates example components of a device 1300 in accordance with some embodiments. In some embodiments, the device 1300 may include application circuitry 1302, baseband circuitry 1304, Radio Frequency (RF) circuitry 1306, front-end module (FEM) circuitry 1308, one or more antennas 1310, and power management circuitry (PMC) 1312 coupled together at least as shown. The components of the illustrated device 1300 may be included in a UE or a RAN node. In some embodiments, the device 1300 may include less elements (e.g., a RAN node may not utilize application circuitry 1302, and instead include a processor/controller to process IP data received from an EPC). In some embodiments, the device 1300 may include additional elements such as, for example, memory/storage, display, camera, sensor, or input/output (I/O) interface. In other embodiments, the components described below may be included in more than one device (e.g., said circuitries may be separately included in more than one device for Cloud-RAN (C-RAN) implementations).

The application circuitry 1302 may include one or more application processors. For example, the application circuitry 1302 may include circuitry such as, but not limited to, one or more single-core or multi-core processors. The processor(s) may include any combination of general-purpose processors and dedicated processors (e.g., graphics processors, application processors, etc.). The processors may be coupled with or may include memory/storage and may be configured to execute instructions stored in the memory/storage to enable various applications or operating systems to run on the device 1300. In some embodiments, processors of application circuitry 1302 may process IP data packets received from an EPC.

The baseband circuitry 1304 may include circuitry such as, but not limited to, one or more single-core or multi-core processors. The baseband circuitry 1304 may include one or more baseband processors or control logic to process baseband signals received from a receive signal path of the RF circuitry 1306 and to generate baseband signals for a transmit signal path of the RF circuitry 1306. Baseband processing circuity 1304 may interface with the application circuitry 1302 for generation and processing of the baseband signals and for controlling operations of the RF circuitry 1306. For example, in some embodiments, the baseband circuitry 1304 may include a third generation (3G) baseband processor 1304A, a fourth generation (4G) baseband processor 1304B, a fifth generation (5G) baseband processor 1304C, or other baseband processor(s) 1304D for other existing generations, generations in development or to be developed in the future (e.g., second generation (2G), sixth generation (6G), etc.). The baseband circuitry 1304 (e.g., one or more of baseband processors 1304A-D) may handle various radio control functions that enable communication with one or more radio networks via the RF circuitry 1306. In other embodiments, some or all of the functionality of baseband processors 1304A-D may be included in modules stored in the memory 1304G and executed via a Central Processing Unit (CPU) 1304E. The radio control functions may include, but are not limited to, signal modulation/demodulation, encoding/decoding, radio frequency shifting, etc. In some embodiments, modulation/demodulation circuitry of the baseband circuitry 1304 may include Fast-Fourier Transform (FFT), precoding, or constellation mapping/demapping functionality. In some embodiments, encoding/decoding circuitry of the baseband circuitry 1304 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments.

In some embodiments, the baseband circuitry 1304 may include one or more audio digital signal processor(s) (DSP) 1304F. The audio DSP(s) 1304F may be include elements for compression/decompression and echo cancellation and may include other suitable processing elements in other embodiments. Components of the baseband circuitry may be suitably combined in a single chip, a single chipset, or disposed on a same circuit board in some embodiments. In some embodiments, some or all of the constituent components of the baseband circuitry 1304 and the application circuitry 1302 may be implemented together such as, for example, on a system on a chip (SOC).

In some embodiments, the baseband circuitry 1304 may provide for communication compatible with one or more radio technologies. For example, in some embodiments, the baseband circuitry 1304 may support communication with an evolved universal terrestrial radio access network (EUTRAN) or other wireless metropolitan area networks (WMAN), a wireless local area network (WLAN), a wireless personal area network (WPAN). Embodiments in which the baseband circuitry 1304 is configured to support radio communications of more than one wireless protocol may be referred to as multi-mode baseband circuitry.

RF circuitry 1306 may enable communication with wireless networks using modulated electromagnetic radiation through a non-solid medium. In various embodiments, the RF circuitry 1306 may include switches, filters, amplifiers, etc. to facilitate the communication with the wireless network. RF circuitry 1306 may include a receive signal path which may include circuitry to down-convert RF signals received from the FEM circuitry 1308 and provide baseband signals to the baseband circuitry 1304. RF circuitry 1306 may also include a transmit signal path which may include circuitry to up-convert baseband signals provided by the baseband circuitry 1304 and provide RF output signals to the FEM circuitry 1308 for transmission.

In some embodiments, the receive signal path of the RF circuitry 1306 may include mixer circuitry 1306a, amplifier circuitry 1306b and filter circuitry 1306c. In some embodiments, the transmit signal path of the RF circuitry 1306 may include filter circuitry 1306c and mixer circuitry 1306a. RF circuitry 1306 may also include synthesizer circuitry 1306d for synthesizing a frequency for use by the mixer circuitry 1306a of the receive signal path and the transmit signal path. In some embodiments, the mixer circuitry 1306a of the receive signal path may be configured to down-convert RF signals received from the FEM circuitry 1308 based on the synthesized frequency provided by synthesizer circuitry 1306d. The amplifier circuitry 1306b may be configured to amplify the down-converted signals and the filter circuitry 1306c may be a low-pass filter (LPF) or band-pass filter (BPF) configured to remove unwanted signals from the down-converted signals to generate output baseband signals. Output baseband signals may be provided to the baseband circuitry 1304 for further processing. In some embodiments, the output baseband signals may be zero-frequency baseband signals, although this is not a necessity. In some embodiments, mixer circuitry 1306a of the receive signal path may comprise passive mixers, although the scope of the embodiments is not limited in this respect.

In some embodiments, the mixer circuitry 1306a of the transmit signal path may be configured to up-convert input baseband signals based on the synthesized frequency provided by the synthesizer circuitry 1306d to generate RF output signals for the FEM circuitry 1308. The baseband signals may be provided by the baseband circuitry 1304 and may be filtered by filter circuitry 1306c.

In some embodiments, the mixer circuitry 1306a of the receive signal path and the mixer circuitry 1306a of the transmit signal path may include two or more mixers and may be arranged for quadrature downconversion and upconversion, respectively. In some embodiments, the mixer circuitry 1306a of the receive signal path and the mixer circuitry 1306a of the transmit signal path may include two or more mixers and may be arranged for image rejection (e.g., Hartley image rejection). In some embodiments, the mixer circuitry 1306a of the receive signal path and the mixer circuitry 1306a may be arranged for direct downconversion and direct upconversion, respectively. In some embodiments, the mixer circuitry 1306a of the receive signal path and the mixer circuitry 1306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 1306 may include analog-to-digital converter (ADC) and digital-to-analog converter (DAC) circuitry and the baseband circuitry 1304 may include a digital baseband interface to communicate with the RF circuitry 1306.

In some dual-mode embodiments, a separate radio IC circuitry may be provided for processing signals for each spectrum, although the scope of the embodiments is not limited in this respect.

In some embodiments, the synthesizer circuitry 1306d may be a fractional-N synthesizer or a fractional N/N+1 synthesizer, although the scope of the embodiments is not limited in this respect as other types of frequency synthesizers may be suitable. For example, synthesizer circuitry 1306d may be a delta-sigma synthesizer, a frequency multiplier, or a synthesizer comprising a phase-locked loop with a frequency divider.

The synthesizer circuitry 1306d may be configured to synthesize an output frequency for use by the mixer circuitry 1306a of the RF circuitry 1306 based on a frequency input and a divider control input. In some embodiments, the synthesizer circuitry 1306d may be a fractional N/N+1 synthesizer.

In some embodiments, frequency input may be provided by a voltage controlled oscillator (VCO), although that is not a necessity. Divider control input may be provided by either the baseband circuitry 1304 or the applications processor 1302 depending on the desired output frequency. In some embodiments, a divider control input (e.g., N) may be determined from a look-up table based on a channel indicated by the applications processor 1302.

Synthesizer circuitry 1306d of the RF circuitry 1306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 1306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 1306 may include an IQ/polar converter.

FEM circuitry 1308 may include a receive signal path which may include circuitry configured to operate on RF signals received from one or more antennas 1310, amplify the received signals and provide the amplified versions of the received signals to the RF circuitry 1306 for further processing. FEM circuitry 1308 may also include a transmit signal path which may include circuitry configured to amplify signals for transmission provided by the RF circuitry 1306 for transmission by one or more of the one or more antennas 1310. In various embodiments, the amplification through the transmit or receive signal paths may be done solely in the RF circuitry 1306, solely in the FEM 1308, or in both the RF circuitry 1306 and the FEM 1308.

In some embodiments, the FEM circuitry 1308 may include a TX/RX switch to switch between transmit mode and receive mode operation. The FEM circuitry may include a receive signal path and a transmit signal path. The receive signal path of the FEM circuitry may include an LNA to amplify received RF signals and provide the amplified received RF signals as an output (e.g., to the RF circuitry 1306). The transmit signal path of the FEM circuitry 1308 may include a power amplifier (PA) to amplify input RF signals (e.g., provided by RF circuitry 1306), and one or more filters to generate RF signals for subsequent transmission (e.g., by one or more of the one or more antennas 1310).

In some embodiments, the PMC 1312 may manage power provided to the baseband circuitry 1304. In particular, the PMC 1312 may control power-source selection, voltage scaling, battery charging, or DC-to-DC conversion. The PMC 1312 may often be included when the device 1300 is capable of being powered by a battery, for example, when the device is included in a UE. The PMC 1312 may increase the power conversion efficiency while providing desirable implementation size and heat dissipation characteristics.

While FIG. 13 shows the PMC 1312 coupled only with the baseband circuitry 1304. However, in other embodiments, the PMC 1312 may be additionally or alternatively coupled with, and perform similar power management operations for, other components such as, but not limited to, application circuitry 802, RF circuitry 1306, or FEM 1308.

In some embodiments, the PMC 1312 may control, or otherwise be part of, various power saving mechanisms of the device 1300. For example, if the device 1300 is in an RRC_Connected state, where it is still connected to the RAN node as it expects to receive traffic shortly, then it may enter a state known as Discontinuous Reception Mode (DRX) after a period of inactivity. During this state, the device 1300 may power down for brief intervals of time and thus save power.

If there is no data traffic activity for an extended period of time, then the device 1300 may transition off to an RRC_Idle state, where it disconnects from the network and does not perform operations such as channel quality feedback, handover, etc. The device 1300 goes into a very low power state and it performs paging where again it periodically wakes up to listen to the network and then powers down again. The device 1300 may not receive data in this state, in order to receive data, it can transition back to RRC_Connected state.

An additional power saving mode may allow a device to be unavailable to the network for periods longer than a paging interval (ranging from seconds to a few hours). During this time, the device is totally unreachable to the network and may power down completely. Any data sent during this time incurs a large delay and it is assumed the delay is acceptable.

Processors of the application circuitry 1302 and processors of the baseband circuitry 1304 may be used to execute elements of one or more instances of a protocol stack. For example, processors of the baseband circuitry 1304, alone or in combination, may be used execute Layer 3, Layer 2, or Layer 1 functionality, while processors of the application circuitry 1304 may utilize data (e.g., packet data) received from these layers and further execute Layer 4 functionality (e.g., transmission communication protocol (TCP) and user datagram protocol (UDP) layers). As referred to herein, Layer 3 may comprise a radio resource control (RRC) layer, described in further detail below. As referred to herein, Layer 2 may comprise a medium access control (MAC) layer, a radio link control (RLC) layer, and a packet data convergence protocol (PDCP) layer, described in further detail below. As referred to herein, Layer 1 may comprise a physical (PHY) layer of a UE/RAN node, described in further detail below.

Figure 14:
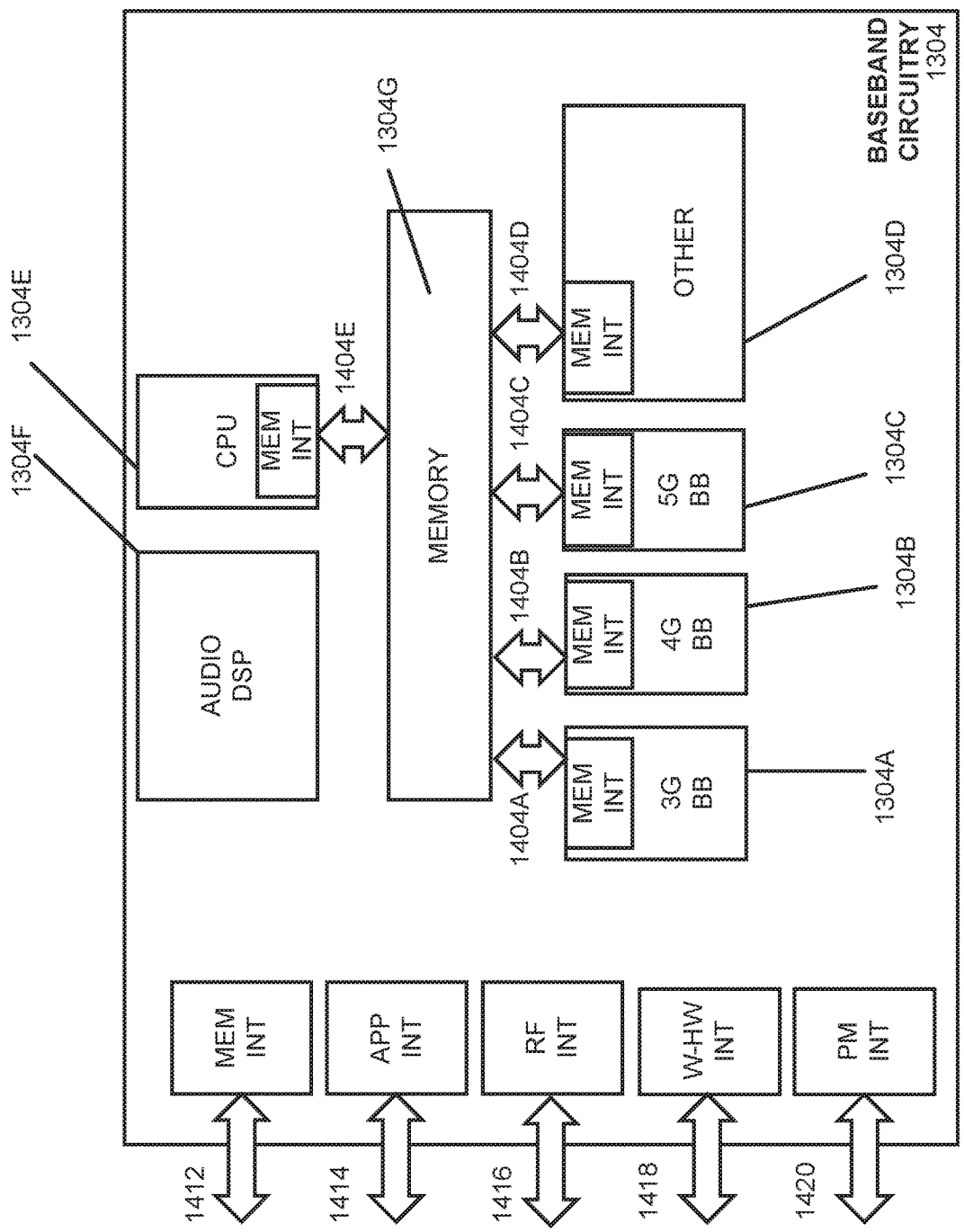
FIG. 14 illustrates example interfaces of baseband circuitry in accordance with an example.

FIG. 14 illustrates example interfaces of baseband circuitry in accordance with some embodiments. As discussed above, the baseband circuitry 1304 of FIG. 13 may comprise processors 1304A-1304E and a memory 1304G utilized by said processors. Each of the processors 1304A-1304E may include a memory interface, 1404A-1404E, respectively, to send/receive data to/from the memory 1304G.

The baseband circuitry 1304 may further include one or more interfaces to communicatively couple to other circuitries/devices, such as a memory interface 1412 (e.g., an interface to send/receive data to/from memory external to the baseband circuitry 1304), an application circuitry interface 1414 (e.g., an interface to send/receive data to/from the application circuitry 1302 of FIG. 13), an RF circuitry interface 1416 (e.g., an interface to send/receive data to/from RF circuitry 1306 of FIG. 13), a wireless hardware connectivity interface 1418 (e.g., an interface to send/receive data to/from Near Field Communication (NFC) components, Bluetooth® components (e.g., Bluetooth® Low Energy), Wi-Fi® components, and other communication components), and a power management interface 1420 (e.g., an interface to send/receive power or control signals to/from the PMC 1312.

Figure 15:
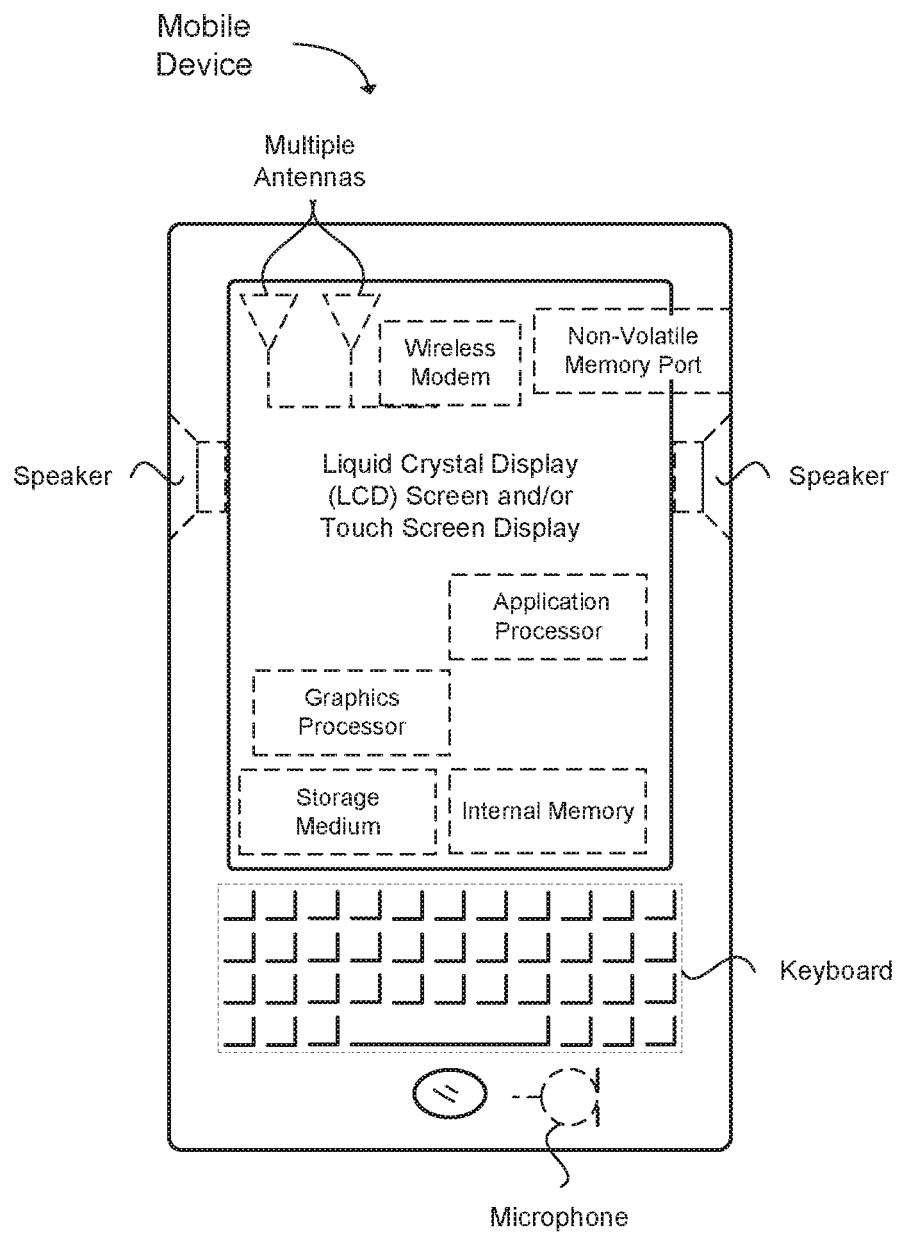
FIG. 15 illustrates a diagram of a wireless device (e.g., UE) in accordance with an example.

FIG. 15 provides an example illustration of the wireless device, such as a user equipment (UE), a mobile station (MS), a mobile wireless device, a mobile communication device, a tablet, a handset, or other type of wireless device. The wireless device can include one or more antennas configured to communicate with a node, macro node, low power node (LPN), or, transmission station, such as a base station (BS), an evolved Node B (eNB), a baseband processing unit (BBU), a remote radio head (RRH), a remote radio equipment (RRE), a relay station (RS), a radio equipment (RE), or other type of wireless wide area network (WWAN) access point. The wireless device can be configured to communicate using at least one wireless communication standard such as, but not limited to, 3GPP LTE, WiMAX, High Speed Packet Access (HSPA), Bluetooth, and WiFi. The wireless device can communicate using separate antennas for each wireless communication standard or shared antennas for multiple wireless communication standards. The wireless device can communicate in a wireless local area network (WLAN), a wireless personal area network (WPAN), and/or a WWAN. The wireless device can also comprise a wireless modem. The wireless modem can comprise, for example, a wireless radio transceiver and baseband circuitry (e.g., a baseband processor). The wireless modem can, in one example, modulate signals that the wireless device transmits via the one or more antennas and demodulate signals that the wireless device receives via the one or more antennas.

FIG. 15 also provides an illustration of a microphone and one or more speakers that can be used for audio input and output from the wireless device. The display screen can be a liquid crystal display (LCD) screen, or other type of display screen such as an organic light emitting diode (OLED) display. The display screen can be configured as a touch screen. The touch screen can use capacitive, resistive, or another type of touch screen technology. An application processor and a graphics processor can be coupled to internal memory to provide processing and display capabilities. A non-volatile memory port can also be used to provide data input/output options to a user. The non-volatile memory port can also be used to expand the memory capabilities of the wireless device. A keyboard can be integrated with the wireless device or wirelessly connected to the wireless device to provide additional user input. A virtual keyboard can also be provided using the touch screen.

Examples

The following examples pertain to specific technology embodiments and point out specific features, elements, or actions that can be used or otherwise combined in achieving such embodiments.

Example 1 includes an apparatus of a user equipment (UE), operable for an uplink partial subframe transmission on an unlicensed carrier, the apparatus comprising: one or more processors configured to: select one or more uplink (UL) partial subframe configurations based on one or more prospective lengths of a listen before talk (LBT) period, wherein each prospective length of the LBT period provides a prospective starting time; encode data for each of the one or more UL partial subframe configurations to form one or more UL partial subframe configuration encodings; identify an actual LBT period; select one of the one or more UL partial subframe configuration encodings for UL transmission of the data on the unlicensed carrier based on the actual LBT period and a corresponding prospective starting time; and a memory interface configured to store in a memory the one or more UL partial subframe configurations.

Example 2 includes the apparatus of example 1, wherein the one or more processors are further configured to encode the data for each of the one or more UL partial subframe configurations for transmission in a physical uplink shared channel (PUSCH).

Example 3 includes the apparatus of example 2, wherein the one or more processors are further configured to encode the data in the PUSCH with a symbol duration of 2, 3, 4, 5, or 6 symbols in a UL partial subframe.

Example 4 includes the apparatus of example 1 or 2, wherein the one or more processors are further configured to: link each of the one or more UL partial subframe configuration encodings with a selected start time, wherein each selected start time is associated with a different encoding; and link each of the one or more UL partial subframe configuration encodings with a same hybrid automatic repeat request (HARQ) identification (ID).

Example 5 includes the apparatus of example 1 or 2, wherein the one or more processors are further configured to encode the data for each of the one or more UL partial subframe configurations, wherein each UL partial subframe configuration is based on a symbol level UL partial subframe or a slot level UL partial subframe.

Example 6 includes the apparatus of example 1 to 3, wherein the one or more UL partial subframe configuration encodings enables a use of UL partial subframes to provide UL to downlink (DL) switching between subframes.

Example 7 includes the apparatus of example 1 to 3, wherein the one or more UL partial subframe configuration encodings enables a use of UL partial subframes to create a variable length LBT period prior to a transmission of data.

Example 8 includes the apparatus of example 1, wherein the one or more processors are further configured to encode the data for each of the one or more UL partial subframe configurations for transmission immediately following a variable length LBT period.

Example 9 includes the apparatus of example 1 to 8, wherein the variable length LBT period is a category 4 (CAT-4) LBT.

Example 10 includes the apparatus of example 1, wherein the one or more processors are further configured to decode an UL grant, wherein the UL grant is used to schedule and indicate UL partial subframes.

Example 11 includes the apparatus of example 1, wherein the one or more processors are further configured to encode the data for each of the one or more UL partial subframe configurations for a grantless UL transmission.

Example 12 includes the apparatus of example 1, wherein the one or more processors are further configured to decode an UL grant, wherein the UL grant includes one or more lengths for a partial subframe in the one or more UL partial subframe configuration encodings.

Example 13 includes the apparatus of example 1, wherein the one or more processors are further configured to decode a radio resource control (RRC) message, wherein the RRC message includes one or more lengths for a partial subframe in the one or more UL partial subframe configuration encodings.

Example 14 includes an apparatus of base station (BS), operable for an uplink (UL) partial subframe reception on an unlicensed carrier, the apparatus comprising: one or more processors configured to: encode for transmission to a user equipment (UE) one or more lengths for a UL partial subframe for one or more UL partial subframe configuration encodings by the UE; determine at the BS, a starting position of a UL partial subframe reception; decode data at the BS in the UL partial subframe reception; and a memory interface configured to store in a memory the data in the UL partial subframe reception.

Example 15 includes the apparatus of example 14, wherein the one or more processors are further configured to decode the data at the BS in a physical uplink shared channel (PUSCH) partial subframe reception.

Example 16 includes the apparatus of example 14 or 15, wherein the one or more processors are further configured to determine the starting position based on a demodulation reference signal (DMRS) in a preamble of the UL partial subframe reception.

Example 17 includes the apparatus of example 16, wherein the one or more processors are further configured to decode the DMRS in a UL partial subframe.

Example 18 includes the apparatus of example 16, wherein the one or more processors are further configured to decode the DMRS in a partial symbol, or multiple symbols.

Example 19 includes the apparatus of example 16, wherein the one or more processors are further configured to decode the DMRS in multiple symbols containing a repeated reception of a 9-microsecond sequence to align a slot boundary of an UL partial subframe.

Example 20 includes the apparatus of example 16, wherein the one or more processors are further configured to blindly detect a length of the one or more lengths for the UL partial subframe based on the preamble.

Example 21 includes at least one machine readable storage medium having instructions embodied thereon for a user equipment (UE) configured to operate for an uplink partial subframe transmission on an unlicensed carrier, the instruction when executed by one or more processors at the UE perform the following: select one or more uplink (UL) partial subframe configurations based on one or more prospective lengths of a listen before talk (LBT) period, wherein each prospective length of the LBT period provides a prospective starting time; encode data for each of the one or more UL partial subframe configurations to form one or more UL partial subframe configuration encodings; identify an actual LBT period; and select one of the one or more UL partial subframe configuration encodings for UL transmission of the data on the unlicensed carrier based on the actual LBT period and a corresponding prospective starting time.

Example 22 includes the at least one machine readable storage medium in example 21 further comprising instructions, that when executed by one or more processors at the UE, perform the following: encode the data for each of the one or more UL partial subframe configurations for transmission in a physical uplink shared channel (PUSCH).

Example 23 includes the at least one machine readable storage medium in example 21 or 22 further comprising instructions, that when executed by one or more processors at the UE, perform the following: encode the data in the PUSCH with a symbol duration of 2, 3, 4, 5, or 6 symbols in a UL partial subframe.

Example 24 includes the at least one machine readable storage medium in example 21 or 22 further comprising instructions, that when executed by one or more processors at the UE, perform the following: link each of the one or more UL partial subframe configuration encodings with a selected start time, wherein each selected start time is associated with a different encoding; and link each of the one or more UL partial subframe configuration encodings with a same hybrid automatic repeat request (HARQ) identification (ID).

Example 25 includes the at least one machine readable storage medium in example 21 or 22 further comprising instructions, that when executed by one or more processors at the UE, perform the following: encode the data for each of the one or more UL partial subframe configurations, wherein each UL partial subframe configuration is based on a symbol level UL partial subframe or a slot level UL partial subframe.

Example 26 includes the at least one machine readable storage medium in example 21 or 22 further comprising instructions, that when executed by one or more processors at the UE, perform the following: encode the data for each of the one or more UL partial subframe configurations for transmission immediately following a variable length LBT period.

Example 27 includes the at least one machine readable storage medium in example 21 further comprising instructions, that when executed by one or more processors at the UE, perform the following: decode an UL grant, wherein the UL grant includes one or more lengths for a partial subframe in the one or more UL partial subframe configuration encodings.

Example 28 includes the at least one machine readable storage medium in example 21 further comprising instructions, that when executed by one or more processors at the UE, perform the following: decode a radio resource control (RRC) message, wherein the RRC message includes one or more lengths for a partial subframe in the one or more UL partial subframe configuration encodings.

Various techniques, or certain aspects or portions thereof, may take the form of program code (i.e., instructions) embodied in tangible media, such as floppy diskettes, compact disc-read-only memory (CD-ROMs), hard drives, non-transitory computer readable storage medium, or any other machine-readable storage medium wherein, when the program code is loaded into and executed by a machine, such as a computer, the machine becomes an apparatus for practicing the various techniques. In the case of program code execution on programmable computers, the computing device may include a processor, a storage medium readable by the processor (including volatile and non-volatile memory and/or storage elements), at least one input device, and at least one output device. The volatile and non-volatile memory and/or storage elements may be a random-access memory (RAM), erasable programmable read only memory (EPROM), flash drive, optical drive, magnetic hard drive, solid state drive, or other medium for storing electronic data. The node and wireless device may also include a transceiver module (i.e., transceiver), a counter module (i.e., counter), a processing module (i.e., processor), and/or a clock module (i.e., clock) or timer module (i.e., timer). In one example, selected components of the transceiver module can be located in a cloud radio access network (C-RAN). One or more programs that may implement or utilize the various techniques described herein may use an application programming interface (API), reusable controls, and the like. Such programs may be implemented in a high level procedural or object oriented programming language to communicate with a computer system. However, the program(s) may be implemented in assembly or machine language, if desired. In any case, the language may be a compiled or interpreted language, and combined with hardware implementations.

As used herein, the term "circuitry" may refer to, be part of, or include an Application Specific Integrated Circuit (ASIC), an electronic circuit, a processor (shared, dedicated, or group), and/or memory (shared, dedicated, or group) that execute one or more software or firmware programs, a combinational logic circuit, and/or other suitable hardware components that provide the described functionality. In some embodiments, the circuitry may be implemented in, or functions associated with the circuitry may be implemented by, one or more software or firmware modules. In some embodiments, circuitry may include logic, at least partially operable in hardware.

It should be understood that many of the functional units described in this specification have been labeled as modules, in order to more particularly emphasize their implementation independence. For example, a module may be implemented as a hardware circuit comprising custom very-large-scale integration (VLSI) circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions, which may, for instance, be organized as an object, procedure, or function. Nevertheless, the executables of an identified module may not be physically located together, but may comprise disparate instructions stored in different locations which, when joined logically together, comprise the module and achieve the stated purpose for the module.

Indeed, a module of executable code may be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network. The modules may be passive or active, including agents operable to perform desired functions.

Reference throughout this specification to "an example" or "exemplary" means that a particular feature, structure, or characteristic described in connection with the example is included in at least one embodiment of the present technology. Thus, appearances of the phrases "in an example" or the word "exemplary" in various places throughout this specification are not necessarily all referring to the same embodiment.

As used herein, a plurality of items, structural elements, compositional elements, and/or materials may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. In addition, various embodiments and example of the present technology may be referred to herein along with alternatives for the various components thereof. It is understood that such embodiments, examples, and alternatives are not to be construed as defacto equivalents of one another, but are to be considered as separate and autonomous representations of the present technology.

Furthermore, the described features, structures, or characteristics may be combined in any suitable manner in one or more embodiments. In the following description, numerous specific details are provided, such as examples of layouts, distances, network examples, etc., to provide a thorough understanding of embodiments of the technology. One skilled in the relevant art will recognize, however, that the technology can be practiced without one or more of the specific details, or with other methods, components, layouts, etc. In other instances, well-known structures, materials, or operations are not shown or described in detail to avoid obscuring aspects of the technology.

While the forgoing examples are illustrative of the principles of the present technology in one or more particular applications, it will be apparent to those of ordinary skill in the art that numerous modifications in form, usage and details of implementation can be made without the exercise of inventive faculty, and without departing from the principles and concepts of the technology. Accordingly, it is not intended that the technology be limited, except as by the claims set forth below.

What is claimed is:

1. An apparatus of a user equipment (UE), operable for an uplink partial subframe transmission on an unlicensed carrier, the apparatus comprising: one or more processors configured to: select a plurality of uplink (UL) partial subframe configurations based on prospective lengths of a listen before talk (LBT) period, wherein each prospective length of the LBT period provides a prospective starting time; encode data for selected ones of the plurality of UL partial subframe configurations, skipping one or more encodings based on a random counter, to form a plurality of UL partial subframe configuration encodings for a same hybrid automatic repeat request (HARQ) identification (ID) according to different starting positions of the prospective lengths; associate each of the plurality of UL partial subframe configuration encodings with a selected prospective starting time, wherein each selected prospective starting time is associated with a different encoding; identify an actual LBT period; select one of the plurality of UL partial subframe configuration encodings for UL transmission of the data on the unlicensed carrier based on the actual LBT period and a corresponding selected prospective starting time; and a memory interface configured to store in a memory the plurality of UL partial subframe configurations.

2. The apparatus of the UE of claim 1, wherein the one or more processors are further configured to encode the data for each of the plurality of UL partial subframe configurations for transmission in a physical uplink shared channel (PUSCH).

3. The apparatus of the UE of claim 2, wherein the one or more processors are further configured to encode the data in the PUSCH with a symbol duration of 2, 3, 4, 5, or 6 symbols in a UL partial subframe.

4. The apparatus of the UE of claim 1, wherein the one or more processors are further configured to encode the data for each of the plurality of UL partial subframe configurations, wherein each UL partial subframe configuration is based on a symbol level UL partial subframe or a slot level UL partial subframe.

5. The apparatus of the UE of claim 1, wherein the plurality of UL partial subframe configuration encodings enables a use of UL partial subframes to provide UL to downlink (DL) switching between subframes.

6. The apparatus of the UE of claim 1, wherein the plurality of UL partial subframe configuration encodings enables a use of UL partial subframes to create a variable length LBT period prior to a transmission of data.

7. The apparatus of the UE of claim 1, wherein the one or more processors are further configured to encode the data for each of the plurality of UL partial subframe configurations for transmission immediately following a variable length LBT period.

8. The apparatus of the UE of claim 1, wherein the variable length LBT period is a category 4 (CAT-4) LBT.

9. The apparatus of the UE of claim 1, wherein the one or more processors are further configured to encode the data for each of the plurality of UL partial subframe configurations for a grantless UL transmission.

10. At least one non-transitory machine readable storage medium having instructions embodied thereon for a user equipment (UE) configured to operate for an uplink partial subframe transmission on an unlicensed carrier, the instruction when executed by one or more processors at the UE perform the following: select a plurality of uplink (UL) partial subframe configurations based on prospective lengths of a listen before talk (LBT) period, wherein each prospective length of the LBT period provides a prospective starting time; encode data for selected ones of the plurality of UL partial subframe configurations, skipping one or more encodings based on a random counter, to form a plurality of UL partial subframe configuration encodings for a same hybrid automatic repeat request (HARQ) identification (ID) according to different starting positions of the prospective lengths; associate each of the plurality of UL partial subframe configuration encodings with a selected prospective starting time, wherein each selected prospective starting time is associated with a different encoding; identify an actual LBT period; and select one of the plurality of UL partial subframe configuration encodings for UL transmission of the data on the unlicensed carrier based on the actual LBT period and a corresponding selected prospective starting time.

11. The at least one non-transitory machine readable storage medium in claim 10 further comprising instructions, that when executed by one or more processors at the UE, perform the following:
encode the data for each of the plurality of UL partial subframe configurations for transmission in a physical uplink shared channel (PUSCH).

12. The at least one non-transitory machine readable storage medium in claim 10 further comprising instructions, that when executed by one or more processors at the UE, perform the following:
encode the data in the PUSCH with a symbol duration of 2, 3, 4, 5, or 6 symbols in a UL partial subframe.

13. The at least one non-transitory machine readable storage medium in claim 10 further comprising instructions, that when executed by one or more processors at the UE, perform the following:
encode the data for each of the plurality of UL partial subframe configurations, wherein each UL partial subframe configuration is based on a symbol level UL partial subframe or a slot level UL partial subframe.

14. The at least one non-transitory machine readable storage medium in claim 10 further comprising instructions, that when executed by one or more processors at the UE, perform the following:
encode the data for each of the plurality of UL partial subframe configurations for transmission immediately following a variable length LBT period.

* * * * *